United States Patent
Kim et al.

(10) Patent No.: US 8,670,359 B2
(45) Date of Patent: *Mar. 11, 2014

(54) METHOD OF CONTROLLING DATA TRANSMISSION FOR MBS IN BROADBAND WIRELESS ACCESS SYSTEM

(75) Inventors: Yong Ho Kim, Bucheon-si (KR); Ki Seon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 803 days.

This patent is subject to a terminal disclaimer.

(21) Appl. No.: 11/816,213

(22) PCT Filed: Feb. 13, 2006

(86) PCT No.: PCT/KR2006/000504
§ 371 (c)(1),
(2), (4) Date: Aug. 14, 2007

(87) PCT Pub. No.: WO2006/085732
PCT Pub. Date: Aug. 17, 2006

(65) Prior Publication Data
US 2009/0046637 A1    Feb. 19, 2009

(30) Foreign Application Priority Data

Feb. 14, 2005  (KR) .................. 10-2005-0011995
Mar. 10, 2005  (KR) .................. 10-2005-0019879

(51) Int. Cl.
G08C 17/00  (2006.01)
H04H 20/71  (2008.01)
H04W 4/00  (2009.01)
H04J 3/26  (2006.01)
H04N 7/173  (2011.01)

(52) U.S. Cl.
USPC ........... 370/311; 370/312; 370/328; 370/432; 725/106; 725/123

(58) Field of Classification Search
USPC .................. 370/310–350, 432; 725/106, 123
See application file for complete search history.

(56) References Cited

U.S. PATENT DOCUMENTS

| 6,701,129 B1 | 3/2004 | Hashem et al. |
| 7,020,185 B1 | 3/2006 | Balachandran et al. |

(Continued)

FOREIGN PATENT DOCUMENTS

| KR | 10-1999-0053163 | 7/1999 |
| WO | 03/094554 | 11/2003 |

(Continued)

OTHER PUBLICATIONS

IEEE Standards. '802.16" Air Interface for Fixed Broadband Wireless Access Systems', IEEE, New York, NY, USA, Apr. 8, 2002.

(Continued)

Primary Examiner — Un C Cho
Assistant Examiner — Jeremy Costin
(74) Attorney, Agent, or Firm — Lee, Hong, Degerman, Kang & Waimey

(57) ABSTRACT

The present invention relates to a method of controlling data transmission for a multimedia/broadcast service (MBS) in a broadband wireless access system. In a data transmission control method for a multicast broadcast service (MBS) in a broadband wireless access system, the present invention includes the steps of receiving information for a downlink burst profile suitable for receiving MBS data from at least one mobile subscriber station, selecting a downlink burst profile suitable for transmitting the MBS data using the information for the downlink burst profile, and transmitting the MBS data to the at least one mobile subscriber station using the selected downlink burst profile.

4 Claims, 22 Drawing Sheets

(56) References Cited

U.S. PATENT DOCUMENTS

| | | | |
|---|---|---|---|
| 7,177,658 B2 | 2/2007 | Willenegger et al. | |
| 7,227,874 B2 | 6/2007 | Kim et al. | |
| 7,668,966 B2 | 2/2010 | Klinker et al. | |
| 7,752,519 B2* | 7/2010 | Yeo et al. | 714/748 |
| 2002/0118666 A1* | 8/2002 | Stanwood et al. | 370/345 |
| 2003/0002495 A1 | 1/2003 | Shahar et al. | |
| 2003/0005382 A1 | 1/2003 | Chen et al. | |
| 2003/0220119 A1* | 11/2003 | Terry | 455/466 |
| 2004/0151133 A1 | 8/2004 | Yi et al. | |
| 2004/0224698 A1 | 11/2004 | Yi et al. | |
| 2005/0041573 A1* | 2/2005 | Eom et al. | 370/208 |
| 2005/0107036 A1* | 5/2005 | Song et al. | 455/23 |
| 2005/0113099 A1* | 5/2005 | Eriksson et al. | 455/450 |
| 2005/0117539 A1* | 6/2005 | Song et al. | 370/328 |
| 2005/0118992 A1* | 6/2005 | Jeong et al. | 455/422.1 |
| 2005/0129058 A1* | 6/2005 | Casaccia et al. | 370/464 |
| 2005/0159163 A1* | 7/2005 | Chang et al. | 455/450 |
| 2005/0249142 A1 | 11/2005 | Kim et al. | |
| 2005/0259643 A1* | 11/2005 | Chuah et al. | 370/389 |
| 2006/0007889 A1* | 1/2006 | Khan | 370/331 |
| 2006/0268882 A1* | 11/2006 | Mademann | 370/394 |
| 2007/0165551 A1* | 7/2007 | Proctor et al. | 370/312 |
| 2007/0178916 A1* | 8/2007 | Sorbara et al. | 455/458 |
| 2008/0232291 A1* | 9/2008 | Hus et al. | 370/312 |
| 2009/0067374 A1* | 3/2009 | Yoon et al. | 370/329 |
| 2009/0175178 A1* | 7/2009 | Yoon et al. | 370/252 |
| 2009/0303909 A1* | 12/2009 | Farhoudi et al. | 370/312 |

FOREIGN PATENT DOCUMENTS

| | | |
|---|---|---|
| WO | 2004/042963 | 5/2004 |
| WO | WO 2004-064424 A1 | 7/2004 |

OTHER PUBLICATIONS

Ryu et al., "Method of Providing MBS Feedback," IEEE 802.16 Broadband Wireless Access Working Group, IEEE C802.16e-05/026, Jan. 2005.

K. Ryu et al., "Method of Providing MBS Feedback," IEEE 802.16 Broadband Wireless Access Working Group, IEEE C802.16e-05/026, Jan. 2005.

* cited by examiner

Prior Art

FIG. 10

| HT = 1(1) | EC = 1(1) | N/M flag=0(1) | CII=1(1) | Feedback Type= 0b1001(4) | Feedback content =CCC(4bits) + Preferred DIUC(4bits) |
|---|---|---|---|---|---|
| | | | | Reserved (8) | MBS CID MSB (8) |
| | | | | MBS CID LSB (8) | HCS (8) |

FIG. 18

| HT=1(1) | EC=1(1) | N/M flag=0(1) | CIT=1(1) | Feedback Type= 0b1001(4) | Feedback Contect =CCC(4 bits)+Preferred DIUC(4 bits) |
|---|---|---|---|---|---|
| Reserved(8) | | | | | MBS CID MBS(8) |
| MBS CID LSB(8) | | | | | HCS(8) |

METHOD OF CONTROLLING DATA TRANSMISSION FOR MBS IN BROADBAND WIRELESS ACCESS SYSTEM

CROSS-REFERENCE TO RELATED APPLICATIONS

This application is a 371 U.S. national stage application of International Application No. PCT/KR2006/000504, filed on Feb. 13, 2006, which claims priority to Korean Application Nos. 10-2005-0019879, filed on Mar. 10, 2005 and 10-2005-0011995, filed on Feb. 14, 2005.

TECHNICAL FIELD

The present invention relates to a broadband wireless access system, and more particularly, to a method of controlling data transmission for a multimedia/broadcast service (MBS) in a broadband wireless access system. And, the present invention is particularly suitable for guaranteeing quality of service in the MBS received by mobile subscriber stations and for enabling a base station to efficiently use radio resources by allowing the base station offering the MBS to transmit MBS data via an MBS burst profile that can be appropriately received by the mobile subscriber stations.

BACKGROUND ART

Generally, a broadband wireless access system defines a protocol of a medium access control (MAC) layer and a physical (PHY) layer for a point-to-multipoint connection between a base station and a mobile subscriber station. FIG. 1 is a diagram of protocol layer architecture of a broadband wireless access system.

A physical layer of a broadband wireless access system is mainly classified into a single carrier system and a multi-carrier system (OFDM/OFDMA). The multi-carrier system uses OFDM and employs OFDMA (orthogonal frequency division multiple access) as an access method that can allocate resources by sub-channel unit resulting from grouping carriers in part.

Forward error correction coding selectively uses concatenated code of RS code and convolutional code or block turbo code in common and employs BPSK/QPSK/16-QAM/64-QAM modulation. And, adaptive modulation/coding (AMC) is applied to select a modulation mode and coding rate system dynamically according to a channel status. For AMC, reception signal intensity, signal to noise ratio (CINR) or BER is used in measuring channel quality.

In an OFDMA physical layer, active carriers are separated into groups to be transmitted to different receiving sides per group. And, the group of carriers transmitted to one receiving side is called a sub-channel. Carriers constructing each sub-channel may be adjacent to each other or can be spaced apart to leave an equal distance from each other. Thus, although complexity is increased by enabling a multiple-access by sub-channel unit, it is advantageous in frequency diversity gain, gain according to power concentration and efficient execution of forward power control.

Slot allocated to each user is defined by a 2-dimensional data region and is a set of consecutive sub-channels allocated by a burst. In OFDMA, one data region is represented as a rectangle determined by a time coordinate and a sub-channel coordinate. This data region is allocated to an uplink of a specific user or a base station can transmit the data region to a specific user in downlink. To define the data region in a 2-dimensional space, a number of OFDM symbols in a time domain and a number of consecutive sub-channels starting from a place distant from a reference point by offset in a frequency domain should be given.

MAC data is segmented according to FFC (forward error correction) block size, and each FEC block is extended to occupy three OFDM symbols in a temporal axis of each sub-channel. Mapping keeps being performed by incrementing a sub-channel number for each FEC block until an end of data region is reached. If the end of data region is reached, mapping keeps being performed from an OFDM symbol having a next lower number in the same manner.

FIG. 2 is a diagram of an example of a process for mapping the FEC block to OFDMA sub-channel and OFDM symbol.

FIG. 3 is a diagram of a frame structure of an OFDMA physical layer in a broadband wireless access system. A downlink sub-frame starts from a preamble used for synchronization and equalization in a physical layer. Subsequently, a broadcast-formatted downlink map (DL-MAP) message and uplink map (UL-MAP) message, which define positions and usages of bursts allocated to downlink and uplink, respectively, follow the preamble to define an overall structure of a frame.

DL-MAP message defines a usage allocated per burst to a downlink interval in a burst mode physical layer, and UL-MAP message defines a usage of burst allocated to an uplink interval. Information elements configuring DL-MAP include DIUC (downlink interval usage code), CID (connection ID) and burst position information (sub-channel offset, symbol offset, No. of sub-channels, No. of symbols). And, a downlink traffic interval is identified on a user end by the information elements. Meanwhile, usages of information elements configuring UL-MAP message are decided per CID (connection ID) by UIUC (uplink interval usage code) and a position of a corresponding interval is determined by 'duration'. In this case, a per-interval usage is determined according to a value of UIUC used by UL-MAP. And, each interval starts from a point distant from a previous IE start point by 'duration' regulated by UL-MAP IE.

DCD message and UCD message include modulation types, FEC code types and the like as physical layer associated parameters to be applied to burst intervals allocated to downlink and uplink, respectively. And, the DCD and UCD messages regulate parameters (e.g., values of R-S code, etc.) necessary for various forward error correction code types. Theses parameters are given by burst profiles regulated per UIUC and DIUC within UCD and DCD, respectively.

MAC layer of a broadband wireless access system is basically based on DOCSIS specifications as a cable modem standard of MCNS consortium. Core contents (MAC management system, resource allocation method & supported service, initialization procedure, etc.)) of MAC are similar to DOCSIS specifications except security guarantee according to radio system characteristics, support for various modulations and other partial addition sand revisions.

CS (service-specific convergence sublayer) is a layer existing above MAC CPS (common part sublayer) and performs a function of receiving PDU (protocol data unit) from an upper layer, a function of classification of upper layer PDU, a function of processing upper layer PDU based on this classification, a function of delivering CS PDU to appropriate MAC SAP and a function of receiving CS PDU from a peer entity. And, CS provides a function of classifying upper layer PDUs per connection and an optional function of compressing information of a payloader header or recovering the compressed header information.

MAC CPS maps each packet to a proper service follow in packet transmission between a mobile subscriber station and a base station based on a connection and offers QoS differing in level according to the connection-based service flow. A figure of MAC PDU defined in MAC CPS is explained as follows.

FIG. 4A is a diagram of a format of MAC PDU. MAC PDU is mainly classified into MAC management PDU and user data MAC PDU. The MAC management PDU uses a MAC management message previously regulated for MAC layer's activity as a payload and a MAC header is attached to each payload. And, a band request PDU necessary for each subscriber part to dynamically request a band required for uplink corresponds to a specially formatted MAC management PDU having a header called a request header only without a separate payload. Moreover, the band request header is made to be delivered via contention-based uplink band, thereby enabling a mobile subscriber station, which fails in having an uplink band allocated thereto by a base station, to request the uplink band. FIG. 4B is a diagram of an example of a band request header.

Packet PDU corresponding to user data is mapped to a payload of MAC SDU and becomes MAC PDU by having MAC header and CRC (optional) attached thereto. FIG. 4C is a diagram of an exemplary structure that a plurality of MAC PDUs concatenated with each other to be transmitted as one uplink burst. Each MAC PDU is identified by a generic connection ID (CID) and can be concatenated with a MAC management message, a band request PDU or the like as well as user data in the same burst.

MAC management message is constructed with a field indicating a type of a management message and a management message payload. DCD, UCD, UL-MAP, DL-MAP and the like among management messages correspond to representative management messages each of which directly regulates the aforesaid frame structure, band allocation and physical layer parameters.

A scheduling service is applied to improve efficiency in polling/transmission permission procedure. By clearly illustrating a scheduling service and QoS parameters associated with the scheduling service, a base station can estimate necessary extents of delay and throughput of uplink traffic and offers polling and transmission grant at a proper time correspondingly. Polling is a process that a base station allocates a bandwidth to each mobile subscriber station for a bandwidth request. Scheduling service types proposed by specifications are classified into UGS (Unsolicited Grant Service), rtPS (real-time Polling Service), nrtPS (non-real-time Polling Service) and BE (Best Effort). Additional band allocation request through piggybacking/polling is possible, and bandwidth stealing is possible for scheduling services of other types except UGS in a manner of redistributing a bandwidth allocated to one connection to another connection within an entire band allocated to each mobile subscriber station.

In transmitting downlink data burst to a mobile subscriber station from a base station in a broadband wireless access system, a downlink burst profile management of modifying coding and modulation schemes appropriately according to a downlink signal quality received by the mobile subscriber station is explained as follows.

A downlink burst profile is determined by a base station according to a quality of signal received by each mobile subscriber station. To reduce uplink traffic, a mobile subscriber station measures CINR (carrier to interference and noise ratio) and compares whether an average of CINR lies within an allowed operational range. This range is determined by a threshold level. If the received CINR deviates from the allowed operational range, the mobile subscriber station requests a new burst profile. If an uplink band is allocated to the mobile subscriber station by the base station, the mobile subscriber station transmits a DBPC-REQ (downlink burst profile change request) message using the allocated uplink band. The base station delivers DPBC-RSP (downlink burst profile change response) to the mobile subscriber station to make a response to the request made by the mobile subscriber station. Table 1 and Table 2 show examples of DBPC-REQ and DBPC-RSP messages, respectively.

TABLE 1

| Syntax | Size | Notes |
|---|---|---|
| DBPC-REQ_Message_Format( ) { | | |
| Management Message Type = 23 | 8 bits | |
| Reserved | 4 bits | Shall be set to zero |
| DIUC | 4 bits | Data grant DIUC values. |
| Configuration Change Count | 8 bits | Value of Configuration Change Count provided in DCD defining the burst profile associated with DIUC. |
| } | | |

TABLE 2

| Syntax | Size | Notes |
|---|---|---|
| DBPC-RSP_Message_Format( ) { | | |
| Management Message Type = 24 | 8 bits | |
| reserved | 4 bits | Shall be set to zero |
| DIUC | 4 bits | Data grant DIUC values. |
| Configuration Change Count | 8 bits | Value of Configuration Change Count provided in DCD defining the burst profile associated with DIUC. |
| } | | |

If a mobile subscriber station is not provided with an uplink band allocated by a base station and if the mobile subscriber station needs to make a request for a change of a downlink burst profile, the mobile subscriber station transmits such a ranging request (RNG-REQ) message as Table 3 in an initial ranging interval. Table 4 shows an example of TLV parameter included in a ranging request message such as Table 3.

TABLE 3

| Syntax | Size | Notes |
|---|---|---|
| RNG-REQ_Message_Format( ) { | | |
| Management Message Type = 4 | 8 bits | |
| Downlink Channel ID | 8 bits | |
| TLV Encoded Information | variable | TLV specific |
| } | | |

TABLE 4

| Name | Type (1 byte) | Length | Value (variable-length) |
|---|---|---|---|
| Requested Downlink Burst Profile | 1 | 1 | Bits 0-3: DIUC of the downlink burst profile requested by the SS for downlink traffic. |

TABLE 4-continued

| Name | Type (1 byte) | Length | Value (variable-length) |
|---|---|---|---|
| | | | Bits 4-7: 4 LSB of Configuration Change Count value of DCD defining the burst profile associated with DIUC |

The base station having received the ranging request (RNG-REQ) message transmits information about a downlink burst profile to be changed to the mobile subscriber station via such a ranging response (RNG-RSP) message as Table 5. And, Table 6 shows an example of TLV parameter included in the ranging response message.

TABLE 5

| Syntax | Size | Notes |
|---|---|---|
| RNG-RSP_Message_Format( ) { | | |
| Management Message Type = 5 | 8 bits | |
| Uplink Channel ID | 8 bits | |
| TLV Encoded Information | variable | TLV specific |
| } | | |

TABLE 6

| Name | Type (1 byte) | Length | Value (variable-length) |
|---|---|---|---|
| Downlink Operational Burst Profile | 7 | 2 | This parameter is sent in response to the RNG-REQ Requested Downlink Burst Profile parameter. Byte 0: Specifies the least robust DIUC that may be used by the BS for transmissions to the SS. Byte 1: Configuration Change Count value of DCD |

TABLE 6-continued

| Name | Type (1 byte) | Length | Value (variable-length) |
|---|---|---|---|
| | | | defining the burst profile associated with DIUC. |

The mobile subscriber station selects a proper burst profile via such a threshold parameter included in DCD message as Table 7. FIG. 5 is a diagram for explaining a relation between CINR and a burst profile according to DIUC.

TABLE 7

| Name | Type (1 byte) | Length | Value (variable-length) | |
|---|---|---|---|---|
| FEC Code type | 150 | 1 | 0 = QPSK(CC) ½<br>1 = QPSK(CC) ¾<br>2 = 16-QAM(CC) ½<br>3 = 16-QAM(CC) ¾<br>4 = 64-QAM(CC) ⅔<br>5 = 64-QAM(CC) ¾<br>6 = QPSK(BTC) ½<br>7 = QPSK(BTC) ¾ or ⅔<br>8 = 16-QAM(BTC) ⅗<br>9 = 16-QAM(BTC) ⅘<br>10 = 64-QAM(BTC) ⅔ or ⅝<br>11 = 64-QAM(BTC) ⅚ or ⅘<br>12 = QPSK(CTC) ½<br>13 = QPSK(CTC) ⅔ | 14 = QPSK(CTC) ¾<br>15 = 16-QAM(CTC) ½<br>16 = 16-QAM(CTC) ¾<br>17 = 64-QAM(CTC) ⅔<br>18 = 64-QAM(CTC) ¾<br>19 = 64-QAM(CTC) ⅚<br>20 = QPSK(ZTCC) ½<br>21 = QPSK(ZTCC) ¾<br>22 = 16-QAM(ZTCC) ½<br>23 = 16-QAM(ZTCC) ¾<br>24 = 64-QAM(ZTCC) ⅔<br>25 = 64-QAM(ZTCC) ¾<br>26 . . . 255 = reserved |
| DIUC Mandatory exit threshold | 151 | 1 | 0-3.75 dB<br>CINR at or below where this DIUC can no longer be used and where this change to a more robust DIUC is required, in 0.25 dB units. | |
| DIUC Minimum entry threshold | 152 | 1 | 0-63.75 dB<br>The minimum CINR required to start using this DIUC when changing from a more robust DIUC is required, in 0.25 dB units. | |

In a broadband wireless access system, an idle mode is supported to reduce power consumption of a mobile subscriber station. In the idle mode, without performing handover in moving between base stations within a paging zone including a plurality of base station areas while not registered to a specific base station, a mobile subscriber station is made to periodically check a presence or non-presence of downlink traffic toward the mobile subscriber station itself by receiving a paging (MOB_PAG-ADV) message, whereby power consumption of the mobile subscriber station can be minimized.

To construct one paging zone, an inter-base station message (Paging-group-action), which has a format such as Table 9, transmitted between base stations by wire is used.

TABLE 9

| Field | Size (bits) | Notes |
|---|---|---|
| Paging-group-action Message_Format( ) { | | |
| Message Type | 8 | |
| Sender BS-ID | 48 | Base station unique identifier (same number as that broadcasted on the DL-MAP message) |
| Target BS-ID | 48 | Base station unique identifier (same number as |

TABLE 9-continued

| Field | Size (bits) | Notes |
|---|---|---|
| | | that broadcasted on the DL-MAP message) |
| Time Stamp | 32 | Number of milliseconds since midnight GMT (set to 0xffffffff to ignore) |
| Action | 4 | 0 - Assign target BS to paging groups<br>1 - Remove target BS from paging groups<br>2 - Query (which paging groups target BS belongs to ?)<br>3 - Information (paging group sender BS belongs to) |
| Num Records | 4 | Number of paging-group-ID records |
| For (j=0; j<Num Records; j++) { | | |
| Paging-group-ID | 16 | Paging-group-ID |
| PAGING_CYCLE | 16 | Cycle in which the paging message is transmitted within the paging group |
| PAGING OFFSET | 3 | MSS PAGING OFFSET parameter |
| } | | |
| Security field | TBD | A means to authenticate this message |
| CRC field | 32 | IEEE CRC-32 |
| } | | |

The paging-group-action message is delivered between a paging controller station and a base station or between base stations. The paging-group-action message can be used for the following four kinds of usages according to combinations of action bits.

First of all, a receiving base station (target BS) can be designated as a specific paging group (Action=0). Secondly, a receiving base station can be excluded from a specific paging group (Action=1). Thirdly, it can be queried that a receiving base station belongs to which paging group (Action=2). Fourthly, it can be indicated that a transmitting base station (sender BS) belongs to which paging group (Action=3).

Since a specific base station can belong to at least one paging zone, the paging-group-action message can include information about a plurality of paging groups. Base stations can know a paging cycle and a paging offset used by each paging zone via the paging-group-action message. It is possible to dynamically assign base station to a paging group via the paging-group-action message.

FIG. 6 is a diagram of an example that a plurality of base stations supporting idle mode belong to a paging group to construct a paging zone.

To enter an idle mode, a mobile subscriber station uses a deregistration request (DREG_REQ) message shown in Table 10.

TABLE 10

| Syntax | Size | Notes |
|---|---|---|
| DREG-REQ_message_format( ) { | | |
| Management Message Type = 49 | 8 bits | |
| De-registration_Request_Code | 8 bits | 0x00 = MSS de-registration request from BS and network<br>0x01 = request for MSS de-registration from Serving BS and |

TABLE 10-continued

| Syntax | Size | Notes |
|---|---|---|
| | | initiation of MSS Idle Mode<br>0x02-0xFF = Reserved |
| TLV encoded parameters | variable | |
| } | | |

Table 11 explains details of 'TLV encoded parameters' of the deregistration request message.

TABLE 11

| Name | Type | Length | Value |
|---|---|---|---|
| Paging Cycle Request | | 2 | Requested cycle in which the paging message is transmitted within the paging group. |
| Idle Mode Retain Information | | 1 | MSS request for Paging Controller retention of network re-entry related MAC management message MSS service and operational information to expedite future Network Re-entry from Idle Mode. For each Bit location, a value of '0' indicates the information associated with the specified MAC management message is not requested to be retained and managed, a value of '1' indicates the information is requested to be retained and managed.<br>Bit #0: Retain MSS service and operation information associated with SBC-REQ/RSP MAC management messages<br>Bit #1: Retain MSS service and operational information associated with PKM-REQ/RSP MAC management messages<br>Bit #2: Retain MSS service and operational information associated with REG-REQ/RSP MAC management<br>Bit #3: Retain MSS service and operational information associated with Network Address<br>Bit #4: Retain MSS service and operational information associated with Time of Day Acquisition<br>Bit #5: Retain MSS service and operational information associated with TFTP MAC management messages<br>Bit #6: Retain MSS service and operational information associated with Full service (MAC state machines, CS classifier information, etc.) |

A mobile subscriber station can make request to enter an idle mode by setting a De-registration Request Code of the deregistration request message to 0x01 and by delivering it to a base station. (In this case, management resource information, which a base station intends to retain, of a mobile subscriber station can be delivered to the base station after a preferred paging cycle and entry to idle mode.)

The base station having received the deregistration request message from the mobile subscriber station can make a response to an idle mode entry request of the mobile subscriber station via a deregistration command (DREG_CMD) message shown in Table 12.

TABLE 12

| Syntax | Size | Notes |
| --- | --- | --- |
| DREG-CMD Message Format( ) { | | |
| Management Message Type = 29 | 8 bits | |
| Action Code | 8 bits | |
| TLV encoded parameters | variable | |
| } | | |

The base station allows an idle mode entry via Action Code of a deregistration command (DREG_CMD) message (Action Code=0x05), makes an idle mode entry requested again after a predetermined duration (Action Code=0x06), or can make an idle mode entry not requested no more until it transmits the deregistration command message (Action Code=0x07).

Action codes and their meanings of the deregistration command message are explained in detail in Table 13.

TABLE 13

| Action Code | Action |
| --- | --- |
| 0x00 | MSS shall immediately terminate service with the BS and attempt network entry at another BS |
| 0x01 | MSS shall listen to the current BS but shall not transmit until an RES-CMD message or DREG_CMD with Action Code 0x00 is received. |
| 0x02 | MSS shall listen to the current BS but only transmit on the Basic, Primary Management, and Secondary Management Connections. |
| 0x03 | MSS shall return to normal operation and may transmit on any of its active connections. |
| 0x04 | MSS shall terminate current Normal Operations with the BS; the BS shall transmit this action code only in response to any MSS DREG-REQ |
| 0x05 | require MSS de-registration from Serving BS and request initiation of MSS Idle Mode |
| 0x06 | The MSS may retransmit the DREG-REQ message after the time duration (REQ-duration) provided in the message |
| 0x07 | The MSS shall not retransmit the DREG-REQ message and shall wait the DREG-CMD message |
| 0x08-0xFF | Reserved |

Through TLV (Type Length Value) item that can be selectively included in the deregistration command message, Paging Group ID, Paging_Cycle and Paging_Offset values, which should be retained by a corresponding mobile subscriber station during an idle mode, can be delivered. Table 14 illustrates paging information included as TLV parameter in a deregistration command message, mobile subscriber station's management resource information retained by a base station after completion of mobile subscriber station's idle mode entry, a paging controller identifier and the like. Informations, which a retained by a base station when a mobile subscriber station enters an idle mode, are provided to enable fast network registration and location update of the mobile subscriber station in a manner that a procedure for acquiring corresponding information in a network registration process can be omitted if a corresponding mobile subscriber station terminates idle mode or executes a location update procedure in the future.

TABLE 14

| Name | Type | Length | Value |
| --- | --- | --- | --- |
| Paging Information | | 4 | Bits 15:0 - PAGING_CYCLE - Cycle in which the paging message is transmitted within the paging group<br>Bits 23:16 - PAGING OFFSET - Determines the frame within the cycle in which the paging message is transmitted. Must be smaller than PAGING CYCLE value<br>Bits 31:24 - Paging-group-ID - ID of the paging group the MSS is assigned to |
| REQ-duration | | 1 | Waiting value for the DREG-REQ message retransmission (measured in frames) |
| Paging Controller ID | | 6 | This is a logical network identifier for the Serving BS or other network entity retaining MSS service and operational information and/or administering paging activity for the MSS while in IDLE mode |
| Idle Mode Retain Information | | 1 | Idle Mode Retain Information is provided as part of this message is indicative only. Network Re-entry from Idle Mode process requirements may change at time of actual reentry. For each bit location, a value of '0' indicates the information for the associated reentry management messages shall not be retained and managed, a value of '1' indicates the information for the associated reentry management message shall be retained and managed.<br>Bit #0: Retain MSS service and operational information associated with SBC-REQ/RSP MAC management messages<br>Bit #1: Retain MSS service and operational information associated with PKM-REQ/RSP MAC management messages<br>Bit #2: Retain MSS service and operational information associated with REG-REQ/RSP MAC management messages<br>Bit #3: Retain MSS service and operational information associated with Network Address<br>Bit #4: Retain MSS service and operational information associated with Time of Day<br>Bit #5: Retain MSS service and operational information associated with TFTP MAC management messages<br>Bit #6: Retain MSS service and operational information associated with Full service (MAC state machines, CS classifier information, etc.) |

Thereafter, the mobile subscriber station can retain or terminate the idle more by receiving a paging broadcast (MOB-PAG-ADV) message shown in Table 15 at a determined paging cycle and paging offset.

TABLE 15

| Syntax | Size | Notes |
| --- | --- | --- |
| MOB_PAG-ADV_Message_Format( ) { | | |
| Management Message type=62 | 8 bits | |

TABLE 15-continued

| Syntax | Size | Notes |
| --- | --- | --- |
| Num_Paging_Group_IDs | 8 bits | Number of paging group IDs in this message |
| For (i=0; i<Num_Paging_Group_IDs; i++) { | | |
| Paging Group ID | 8 bits | |
| } | | |
| Num_MACs | 8 bits | Number of MSS MAC address |
| For (j=0; j<Num_MACs; j++) { | | |
| MSS MAC Address hash | 24 bits | The hash is obtained by computing a CRC24 on the MSS 48-bit MAC address. The polynomial for the calculation is 0x864CFB. |
| Action Code | 2 bits | Paging action instruction to MSS 00 = No Action Required 01 = Perform Ranging to establish location and acknowledge message 10 = Enter Network 11 = reserved |
| Reserved | 6 bits | |
| } | | |
| TLV Encoded Information | variable | TLV specific |
| reserved | variable | Padding bits to ensure octet aligned |
| } | | |

Configuration of Multicast Broadcast Service (hereinafter abbreviated MBS) in a broadband wireless access system is explained as follows.

First of all, Multicast Broadcast Service (hereinafter abbreviated MBS) is a point-to-multipoint service that data is transmitted to a plurality of receivers from one source, by which the same data is transmitted to a plurality of receivers via a common radio channel for an efficient use of radio resources.

FIG. 7 and FIG. 8 are diagrams of examples of a reference model for MBS of a broadband wireless access system.

Referring to FIG. 7, configurational elements for MBS include an MBS contents server (Media Server), an MBS distribution server, base stations (BS) and mobile subscriber stations (MSS). The MBS contents server offers MBS data to the base stations and performs authentication of the mobile subscriber station and encryption key distribution for MBS contents. The MBS distribution server takes charge of scheduling of the MBS data to be delivered to a plurality of the base station. Optionally, the MBS distribution server can be omitted so that the MBS contents server play a scheduling role of the MBS data. The base station provides the MBS data received via a backbone network to the mobile subscriber station via radio interface, and the mobile subscriber station receives the MBS data from the base station.

MBS in a broadband wireless access system can be classified into single base station MBS and multiple base station MBS. The single base station MBS need not use MBS associated parameters identically to deliver the MBS data between base stations but enables point-to-multipoint data transmission by assigning the same MBS associated parameter to mobile subscriber stations attempting to receive specific MBS data within a base station.

The multiple base station MBS delivers MBS data to mobile subscriber stations in a manner of using same MBS associated parameter for a specific MBS between base stations constructed with MBS zone. To enable a mobile subscriber station to recognize MBS zone, MBS zone ID is delivered to a mobile subscriber station. The mobile subscriber station can immediately check whether a currently retained MBS parameter is valid via the MBS zone ID received from the base station. In case that the mobile subscriber station moves away into another base station within the same MBS zone, it is unnecessary to perform a procedure for re-establishing MBS associated parameter to receive MBS data. And, by transmitting MBS data using the same radio resource at the same time, base stations within the same MBS zone can raise MBS data reception efficiency of mobile subscriber stations by macro diversity effect.

MBS of a broadband wireless access system has the following characteristics.

1) Power Consumption Minimization: Mobile subscriber station can minimize power consumption regardless of a current operational mode (e.g., normal operational mode, sleep mode, idle mode) while receiving MBS data.

2) Mobility: Mobile subscriber station is provided with seamless MBS connection while moving between base stations.

3) MBS Zone: MBS contents are transmitted via regionally classified MBS zone and MBS setting information (e.g., MBS connection identifier, encryption key, service identifier, etc.) can be configured different between different MBS zones.

4) Security: MBS contents are delivered to authenticated users only. An encryption key for MAC PDU of MBS data is equally applicable between base stations within MBS zone.

FIG. 9A and FIG. 9B explain an MBS operation of a broadband wireless access system.

(1) Mobile subscriber station attempting to search MBS contents in idle mode terminates an idle mode and then enters a normal operational mode.

(2) The mobile subscriber station makes a request for an MBS list to at lest one MBS contents server via HTTP request message.

(3) The MBS contents server transmits an HTTP response message containing the MBS list to the corresponding mobile subscriber station. The MBS list contained in the HTTP response message may include such information as an MBS contents name, a multicast IP address, a pot number and the like.

(4) The mobile subscriber station having acquired MBS information enters an idle mode or sustains a normal operational mode.

(5) After having acquired the MBS information, the mobile subscriber station delivers a service generation request (DSA-REQ) message containing multicast IP address and port number of specific MBS contents. (Service request message can be delivered to the mobile subscriber station by a base station).

(6) A base station delivers DSx-RVD message indicating a service request message reception to the mobile subscriber station and carries out an authentication procedure for deciding whether a user is suitable for MBS contents reception of the corresponding mobile subscriber station.

(7) Having carried out the authentication procedure, the base station includes downlink parameter information (e.g., service identifier, multicast connection identifier, QoS parameter, security association identifier (SAID), etc.) in a service generation response (DSA-RSP) message and then delivers the message to the corresponding mobile subscriber station.

(8) The mobile subscriber station delivers a key request message (PKM-REQ) to the base station to acquire an MBS key for decoding encrypted MBS PDU from the base station.

(9) The base station delivers a key response message (PKM-RSP) containing the MBS key to the corresponding mobile subscriber station.

(10) The mobile subscriber station receives encrypted MAC PDU for the corresponding MBS contents and then decodes the received MAC PDU via a key received from the base station.

An MBS zone is explained as follows.

MBS associated parameters (e.g., security key, multicast connection identifier, etc.) can be set different according to a region, and MBS contents can be broadcast within a limited zone. So, in moving away into another base station or performing handover, a mobile subscriber station receiving MBS contents needs to decide whether stored MBS information is valid and whether MBS contents can be continuously received. If a current base station provides MBS via parameter different from the MBS information retained by the mobile subscriber station or does not transmit the MBS contents at all, the mobile subscriber station should access a new base station to update the parameter for the MBS contents. To solve this problem, an MBS zone grouping at least one or more MBS providing base stations is managed in a broadband wireless access system.

Base stations within a same MBS zone transmit MBS contents to mobile subscriber stations using the same MBS parameter. And, MBS zone ID is delivered to a mobile subscriber station to enable the mobile subscriber station to recognize MBS zone. The mobile subscriber station can immediately confirm whether a currently retained MBS parameter is valid via the MBS zone ID received from the base station. In case of moving away into another base station within the same MBS zone, the mobile subscriber station does not need to perform a procedure for resetting the MBS associated parameters to receive MBS data. Moreover, by transmitting MBS data at the same time using the same radio resource, base stations within the same MBS zone can raise MBS data reception efficiency of mobile subscriber stations through macro diversity effect.

An operation for power consumption minimization of a mobile subscriber station receiving MBS data is explained as follows.

First of all, a mobile subscriber station can reduce power loss for a period of receiving MBS data regardless of a current operational mode (e.g., normal operational mode, sleep mode, idle mode). A downlink map information element (DL-MAP IE) contained in a downlink map (DL-MAP) message is defined to indicate a burst that is transmitted in a current frame. Yet, a mobile subscriber station should receive and decrypt a downlink map message each frame to receive a broadcast-formatted burst. In this case, it is unable to reduce power consumption. Yet, MBS map information element (MBS_MAP IE) enables a mobile subscriber station not to interpret a downlink frame including a downlink map message for a frame having MBS data not delivered thereto in a manner of informing the mobile subscriber station how many frames will take for MBS data burst to be delivered. So, the MBS map information element (MBS_MAP IE) enables the mobile subscriber station to minimize its power consumption. In particular, MBS_MAP IE has a considerable power saving effect on a mobile subscriber station in sleep or idle mode. Scheduling information of the MBS data burst can be delivered via MBS_MAP IE as one of DL-MAP IE or can be delivered in such a MAC management message format as an MBS MAP message. Table 16 and Table 17 show examples of MBS_MAP IE and MBS MAP message, respectively.

TABLE 16

| Syntax | Size (bits) | Notes |
|---|---|---|
| MBS_MAP_IE | | |
| Extended DIUC | 4 | MBS_MAP = 0x05 |
| Length | 4 | |
| Multicast CID | 12 | 12 LSB of CID for multicast |
| MBS Zone identifier | 7 | MBS Zone identifier corresponds to the identifier provided by the BS at connection initiation |
| Macro diversity enhanced | 1 | 0 = Non Macro-Diversity enhanced zone<br>1 = Macro-Diversity enhanced zone |
| If(Macro diversity enhanced = 1) { | | |
| Permutation | 2 | 0b00 = PUSC permutation,<br>0b01 = FUSC permutation,<br>0b10 = Optional FUSC permutation,<br>0b11 = Adjacent subcarrier permutation |
| Idcell | 6 | |
| OFDMA Symbol Offset | 8 | OFDMA symbol offset with respect to start of the MBS portion |
| Boosting | 3 | It is used to indicate whether boosting is used or not for MBS_MAP message.<br>000: normal (not boosted)<br>001: +6 dB<br>010: −6 dB<br>011: +9 dB<br>100: +3 dB<br>101: −3 dB<br>110: −9 dB<br>111: −12 dB |
| DIUC | 4 | DIUC for MBS_MAP message in MBS portion |
| NO. Subchannels | 6 | It is indicated the size of MBS_MAP message in MBS portion. |
| NO. OFDMA symbols | 2 | It is indicated the size of MBS_MAP message in MBS portion. |
| }else{ | | |
| DIUC | 4 | |
| OFDMA Symbol Offset | 8 | The offset of the OFDMA symbol in which the burst starts, measured in OFDMA symbols from beginning of the downlink frame in which the DL-MAP is transmitted. |
| Subchannel offset | 6 | The lowest index OFDMA subchannel used for carrying the burst, starting from subchannel 0. |
| Boosting | 3 | 000: normal (not boosted)<br>001: +6 dB<br>010: −6 dB<br>011: +9 dB<br>100: +3 dB<br>101: −3 dB<br>110: −9 dB<br>111: −12 dB |
| NO. Symbols | 7 | |
| NO. Subchannels | 6 | |
| Repetition Coding Indication | 2 | 0b00 - No repetition coding<br>0b01 - Repetition coding of 2 used<br>0b10 - Repetition coding of 4 used<br>0b11 - Repetition coding of 6 used |
| Next MBS Frame offset | 8 | The Next MBS frame offset value is lower 8 bits of the frame number in which the BS shall transmit the next MBS frame. |
| Next MBS OFDMA Symbol offset | 8 | The offset of the OFDMA symbol in which the next MBS portion starts, measured in OFDMA symbols from the beginning of the downlink frame in which the MBS-MAP is transmitted. |

TABLE 16-continued

| Syntax | Size (bits) | Notes |
|---|---|---|
| } | | |
| If!(byte boundary){ | | |
| Padding Nibble | variable | Padding to reach byte boundary |
| } | | |
| } | | |

TABLE 17

| Syntax | Size (bits) | Notes |
|---|---|---|
| MBS-MAP Message Format( ){ | | |
| Management Message Type = ? | 4 | |
| Frame number | 4 | The frame number is identical to the frame number in the DL-MAP |
| MBS_DIUC_Change_Count | 8 | |
| #MBS_DATA_IE | 4 | Number of included MBS_DATA_IE |
| For(i=0; i<n; i++){ | 12 | N = #MBS_DATA_IE |
| MBS_DATA_IE | variable | |
| } | 8 | |
| #MBS_DATA_Time_Diversity_IE | 4 | Number of included MBS_DATA_Time_Diversity_IE |
| For(i=0; i<m; i++){ | | M = #MBS_DATA_Time diversity IE |
| MBS_DATA_Time_Diversity_IE | variable | |
| } | | |
| TLV encoding element | | |
| If(!byte boundary){ | | |
| Padding_Nibble | | |
| } | 8 | |

Table 18 shows an example of MBS_DATA_IE included in MBS MAP message.

TABLE 18

| Syntax | Size (bits) | Notes |
|---|---|---|
| MBS_DATA_IE{ | | |
| MBS_MAP type = 0 | 4 | |
| Multicast CID | 12 | 12 LSB of CID for multicast |
| MBS_DIUC | 4 | |
| OFDMA Symbol Offset | 8 | OFDMA symbol offset with respect to start of the MBS portion |
| Subchannel offset | 6 | |
| Boosting | 3 | 000: normal (not boosted)<br>001: +6 dB<br>010: −6 dB<br>011: +9 dB<br>100: +3 dB<br>101: −3 dB<br>110: −9 dB<br>111: −12 dB |
| NO. OFDMA symbols | 7 | |
| NO. Subchannels | 6 | |
| Repetition Coding Indication | 2 | 0b00 - No repetition coding<br>0b01 - Repetition coding of 2 used<br>0b10 - Repetition coding of 4 used<br>0b11 - Repetition coding of 6 used |
| Next MBS frame offset | 8 | The Next MBS frame offset value is lower 8 bits of the frame number in which the BS shall transmit the next BS frame. |

TABLE 18-continued

| Syntax | Size (bits) | Notes |
|---|---|---|
| Next MBS OFDMA Symbol offset | 8 | The offset of the OFDMA symbol in which the next MBS portion starts, measured in OFDMA symbols from the beginning of the downlink frame in which the MBS-MAP is transmitted. |
| }{ | | |

In the related art, MBS feedback information transmission of a mobile subscriber station for a change of MBS burst profile is defined as follows. A base station assigns an uplink band enabling a mobile subscriber station to transmit MBS feedback information via such a feedback polling IE as Table 19, and the mobile subscriber station transmits the MBS feedback information via such a feedback header as shown in FIG. 10 using the uplink band assigned by the base station.

TABLE 19

| Syntax | Size (bits) | Notes |
|---|---|---|
| Feedback polling IE( ) | | |
| { | | |
| Extended UIUC | 4 bits | 0x?? |
| Length | 4 bits | Length in bytes of following fields |
| for (i=0; i<Number Allocations; i++) | | |
| { | | |
| Feedback type | 6 bits | See Table 7b |
| If(Feedback type == 0b10001) | | MBS preferred DIUC feedback |
| { | | |
| MBS CID | 16 bits | Connect ID of the MBS connection that the MSS should feedback for |
| } | | |
| Else | | |
| { | | |
| Basic CID | 16 bits | |

TABLE 19-continued

| Syntax | Size (bits) | Notes |
|---|---|---|
| } | | |
| UIUC | 4 bits | |
| Feedback Type | 6 bits | See Table 7b |
| Duration | 10 bits | In OFDMA slots (see 8.4.3.1) |
| Allocation Offset | 3 bits | The UL feedback shall be transmitted in the frame which is 0-8 frame delay relative to the current frame |
| Period (p) | 2 bits | The UL resource region is dedicated to the MS in every 2 frame. |
| Allocation Duration (d) | 3 bits | The allocation is valid for 10 × 2d frame staring from the frame defined by Allocation_offset. If d == 0b000, the dedicated allocation is de-allocated. If d == 0b111, the dedicated resource shall be valid until the BS commands to de-allocate the dedicated allocation. |
| } | | |
| Padding bits | Variable | To align octet boundary |
| } | | |

Having acquired uplink transmission synchronization with a base station via ranging procedure, a mobile subscriber station, of which management connection with a base station is released, in idle mode transmits MBS feedback information with an MBS feedback header, as shown in FIG. 10, to the base station using a contention-based uplink band (allocated via Feedback Polling IE or allocated for BW REQ header transmission) or can deliver an RNG-REQ message in which feedback information (Preferred DIUC, CCC, MBS CID) TLV parameter like Table 20 is included.

TABLE 20

| Name | Type | Length | Value |
|---|---|---|---|
| MBS Feedback Information | TBD | 3 byte | Preferred DIUC for MBS connection identified by MBS CID<br>Bits 3:0 - Preferred DIUC - Preferred DIUC for MBS connection<br>Bits 7:4 - CCC - Configuration Change Count of DCD associated to DIUC<br>Bits 23:8 - MBS CID |

In the related art, a base station changes a downlink burst profile (coding and modulation scheme) appropriately according to a downlink signal quality of a mobile subscriber station. So, the mobile subscriber station's reception error for downlink data transmitted from the base station by unicast can be minimized and the base station's radio resources can be efficiently used. Yet, in case of MBS data, since the MBS data is not the data a base station transmits to a specific mobile subscriber station by unicast but is transmitted in a broadcast format to corresponding mobile subscriber stations within a base station, it is difficult to provide proper burst profile to all mobile subscriber stations receiving the MBS data. And, it is also difficult to always transmit MBS data burst as robust burst profile for efficient use of resources. So, it is possible that MBS data cannot be received according to a channel status of each mobile subscriber station. In this case, it is possible to guarantee MBS data reception of mobile subscriber station by transmitting MBS data via burst profile suitable for the corresponding mobile subscriber station to receive.

In the related art, an uplink band allocated for MBS feedback transmission is allocated to a specific MBS connection on contention base between mobile subscriber stations. And, each mobile subscriber station receiving a corresponding MBS can transmit a feedback header using the same uplink band allocated through Feedback Polling IE. So, a base station receiving it may be unable to receive feedback information of a mobile subscriber station due to collisions in case that several mobile subscriber stations transmit feedback headers simultaneously. This may be a problem in selecting MBS burst profile as a value suitable for all mobile subscriber stations. Moreover, a mobile subscriber station is defined to transmit MBS feedback information to a base station using MBS feedback information only if unable to receive MBS data currently transmitted from a base station due to a degraded channel status. So, it may cause a problem that the base station always has to transmit MBS data via the most robust profile.

In the related art, in case of multiple base station MBS supporting macro-diversity, base stations within MBS zone should transmit the same MBS data to raise mobile subscriber station's MBS data reception efficiency on a boundary between base stations using the same channel resource, the same time domain and the same burst profile. This brings about difficulty in changing MBS data burst according to a channel status of each mobile subscriber station receiving MBS data. And, since MBS data is transmitted using a fixed burst profile, efficient use of base station resources is not facilitated. Besides, in order to provide MBS to an idle-mode mobile subscriber station capable of receiving MBS data with minimal power consumption without performing a handover procedure in moving between base stations while a management connection with a base station is released, the base station should transmit MBS data for MBS regardless of a presence or non-presence of the mobile subscriber station receiving the MBS data within the base station.

DISCLOSURE OF INVENTION

Accordingly, the present invention is directed to a method of controlling data transmission for a multimedia/broadcast service in a broadband wireless access system that substantially obviate one or more of the problems due to limitations and disadvantages of the related art.

An object of the present invention is to provide a method of controlling data transmission for a multimedia/broadcast service in a broadband wireless access system, by which, in case of a single base station MBS or multiple base station MBS not supporting macro-diversity, a base station can appropriately change a downlink burst profile according to a downlink signal quality or channel status (e.g., decidable based on CINR) of each mobile subscriber station receiving MBS data.

Another object of the present invention is to provide a method of controlling data transmission for a multimedia/broadcast service in a broadband wireless access system, by which an MBS data reception quality of each mobile subscriber station receiving MBS data can be guaranteed regardless of mode in a manner that each idle-mode mobile subscriber station of which downlink burst profile is not managed by a base station is enabled to transmit feedback information associated with a specific downlink burst profile to be received by the mobile subscriber station to the base station.

A further object of the present invention is to provide a method of controlling data transmission for a multimedia/broadcast service in a broadband wireless access system, by which base station's resources can be efficiently used in a manner that the base station is made not to transmit MBS data burst if a mobile subscriber station receiving MBS data does not exit within an area of the corresponding base station in case of multiple base station MBS supporting macro-diversity as well as multiple base station MBS not supporting macro-diversity.

To achieve these and other advantages and in accordance with the purpose of the present invention, in a data transmission control method for a multicast broadcast service (MBS) in a broadband wireless access system, a method of controlling data transmission for a multicast broadcast service includes the steps of receiving information for a downlink burst profile suitable for receiving MBS data from at least one mobile subscriber station, selecting a downlink burst profile suitable for transmitting the MBS data using the information for the downlink burst profile, and transmitting the MBS data to the at least one mobile subscriber station using the selected downlink burst profile.

In another aspect of the present invention, in a data transmission control method for a multicast broadcast service (MBS) in a mobile subscriber station of a broadband wireless access system, a method of controlling data transmission for a multicast broadcast service includes the steps of receiving MBS data transmitted from a base station, determining whether to change a downlink burst profile by checking a downlink quality carrying the MBS data, and if attempting to request the change of the downlink burst profile of the received MBS data, transmitting information for a downlink burst profile suitable for receiving the MBS data to the base station from the specific mobile subscriber station.

The present invention discloses a method that a base station can appropriately change a downlink burst profile for MBS data transmission according to a level of a downlink signal quality (e.g., CINR) of each mobile subscriber station receiving MBS data. And, the present invention discloses a method that an MBS data reception quality of each mobile subscriber station receiving MBS data can be guaranteed regardless of mode in a manner that each idle-mode mobile subscriber station of which downlink burst profile is not managed by a base station is enabled to transmit feedback information associated with a specific downlink burst profile to be received by the mobile subscriber station to the base station. Moreover, the present invention discloses a method that base station's resources can be efficiently used in a manner that the base station is made not to transmit MBS data burst if a mobile subscriber station receiving MBS data does not exit within an area of the corresponding base station in case of multiple base station MBS supporting macro-diversity as well as multiple base station MBS not supporting macro-diversity.

Besides, by the present invention, resources of a base station can be efficiently used in a manner that the base station is made not to transmit MBS data if an MBS reception mobile subscriber station does not exist in an area of the base station despite MBS supporting macro-diversity.

The present invention is provided with the following configuration as a method that a base station transmitting MBS data appropriately selects a downlink burst profile (DIUC defining FEC code type and modulation type) for MBS data transmission.

In selecting a downlink burst profile (DIUC), a base station considers downlink burst profile information (DIUC) of a mobile subscriber station receiving MBS data. Preferably, in case that a plurality of mobile subscriber stations receive MBS data, a base station configures a downlink burst profile of MBS data via a downlink burst profile received by a mobile subscriber station having a poorest downlink signal quality, i.e., a mobile subscriber station receiving MBS data via a most robust burst profile.

An idle-mode mobile subscriber station, which is unable to update a downlink burst profile for a corresponding mobile subscriber station since a management connection with a base station is released, delivers downlink burst profile information (DIUC) the mobile subscriber station attempts to receive to the base station if a DIUC value suitable for a downlink signal quality received from the base station is different from a DIUC value of an MBS data burst currently received from the base station. And, in case that a base station capable of providing MBS is not currently transmitting MBS data, an idle-mode mobile subscriber station makes a request for a transmission of MBS data in a manner of delivering MBS feedback information [MBS burst profile information (DIUC) the mobile subscriber station wishes to receive, MBS CID] to a base station.

Preferably, a base station selects a most robust burst profile as a profile of MBS data burst from MBS feedback information (preferred DIUC) received from an idle-mode mobile subscriber station and DIUCs of normal-mode and sleep-mode mobile subscriber stations receiving MBS data and then delivers the selected profile to mobile subscriber stations.

Thus, a change of a downlink burst profile through the MBS feedback information or the management of a downlink burst profile of each mobile subscriber station is applicable to single base station MBS not supporting macro-diversity.

In case that a mobile subscriber station having made a request for a reception of MBS data does not exist within a base station, the base station does not transmit corresponding MBS data using a radio resource. Yet, the base station transmits MBS MAP message to provide information associated with receivable MBS to an idle-mode mobile subscriber station. The MBS MAP message can include MBS zone ID, MBS CID, MBS MAP scheduling information and the like. The idle-mode mobile subscriber station having received the MBS MAP message transmits information associated with a downlink burst profile (preferred DIUC) to the base station. The information for the downlink burst profile can be transmitted via MBS feedback information together with MBS CID. The base station having received the MBS feedback information from the idle-mode mobile subscriber station transmits MBS data via a downlink burst profile selected based on the downlink burst profiled requested by the idle-mode mobile subscriber station. Yet, in case of multiple base station MBS providing macro-diversity, MBS data can be transmitted from a base station via a fixed downlink burst profile. In this case, the idle-mode mobile subscriber station can make a request for a transmission of corresponding MBS data to the base station by transmitting information associated with specific MBS such as MBS CID and MBS zone ID as MBS feedback information instead of transmitting the downlink burst profile information the idle-mode mobile subscriber station intends to receive. Having received this, the base station can initiate transmission of MBS data from a next MBS transmission frame via a downlink burst profile identically applied within MBS zone.

Table 21 shows an example of MBS MAP information proposed by the present invention, in which MBS MAP information not supporting macro-diversity is included in the related art MBS MAP IE supporting macro-diversity. Table 22 shows MBS MAP IE for a base station to transmit control information associated with MBS data transmission in a broadcast format. For MBS MAP IE a related art base station supporting macro-diversity transmits in a broadcast format, Table 23 shows an example of MBS MAP IE amended by the present invention for a base station not to transmit MBS data in case that an MBS receiving mobile subscriber station does not exist within an area of the base station.

TABLE 21

| Syntax | Size | Notes |
|---|---|---|
| MBS_MAP_IE( ) { | | |
| Extended DIUC | 4 bits | MBS_MAP = 0x05 |
| Length | 4 bits | |
| Multicast CID | 12 bits | 12 LSB of CID for multicast |
| MBS Zone identifier | 7 bits | MBS Zone identifier corresponds to the identifier provided by the BS at connection initiation |
| Macro diversity enhanced | 1 bit | 0 = Non Macro-Diversity enhanced zone<br>1 = Macro-Diversity enhanced zone |
| If(Macro diversity enhanced = 1) { | | |
| Permutation | 2 bits | 0b00 = PUSC permutation,<br>0b01 = FUSC permutation,<br>0b10 = Optional FUSC permutation,<br>0b11 = Adjacent subcarrier permutation |
| Idcell | 6 bits | |
| OFDMA Symbol Offset | 7 bits | OFDMA symbol offset with respect to start of the MBS region |
| DIUC change indication | 1 bit | Used to indicate DIUC change is included |
| If(DIUC change indication = 1) { | | |
| Reserved | 1 bit | |
| Boosting | 3 bits | |
| DIUC | 4 bits | |
| No. Subchannels | 6 bits | |
| NO. OFDMA symbols | 2 bits | |
| } else { | | |
| DIUC | 4 bits | |
| OFDMA Symbol Offset | 8 bits | The offset of the OFDMA symbol in which the burst starts, measured in OFDMA symbols from beginning of the downlink frame in which the DL-MAP is transmitted. |
| Subchannel offset | 6 bits | The lowest index OFDMA subchannel used for carrying the burst, starting from subchannel 0. |
| Boosting | 3 bits | 000: normal (not boosted)<br>001: +6 dB<br>010: −6 dB<br>011: +9 dB<br>100: +3 dB<br>101: −3 dB<br>110: −9 dB<br>111: −12 dB |
| SLC_3_indication | 1 bit | Used to notify sleep mode class 3 is used for single BS MBS |
| NO. OFDMA symbols | 6 bits | |
| NO. Subchannels | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |
| If(SLC_3_indication = 0) { | | |
| Next MBS Frame offset | 8 bits | The Next MBS frame offset value is lower 8 bits of the frame number in which the BS shall transmit the next MBS frame. |
| Next MBS OFDMA Symbol offset | 8 bits | The offset of the OFDMA symbol in which the next MBS portion starts, measured in OFDMA symbols from the beginning of the downlink frame in which the MBS-MAP is transmitted. |
| } | | |
| } | | |
| } else { | | |
| MBS Traffic Indication | 1 bit | 0: MBS data is not transmitted<br>1: MBS data is transmitted |
| If (MBS Traffic Indication) { | | |
| DIUC | | |
| OFDMA Symbol Offset | 8 bits | The offset of the OFDMA symbol in which the burst starts, measured in OFDMA symbols from beginning of the downlink frame in which the DL-MAP is transmitted. |
| Subchannel offset | 6 bits | The lowest index OFDMA subchannel used for carrying the burst, starting from subchannel 0. |
| Boosting | 3 bits | 000: normal (not boosted)<br>001: +6 dB<br>010: −6 dB<br>011: +9 dB<br>100: +3 dB<br>101: −3 dB<br>110: −9 dB<br>111: −12 dB |
| NO. OFDMA symbols | 6 bits | |
| NO. Subchannels | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |
| SLC_3_indication | 1 bit | Used to notify sleep mode class 3 is used for single BS MBS |
| If(SLC_3_indication = 0) { | | |
| Next MBS Frame offset | 8 bits | The Next MBS frame offset value is lower 8 bits of the frame number in which the BS shall transmit the next MBS frame. |
| Next MBS OFDMA Symbol offset | 8 bits | The offset of the OFDMA symbol in which the next MBS zone starts, measured in OFDMA symbols from the beginning of the downlink frame in which the MBS-MAP is transmitted. |
| } else { | | |
| Next MBS MAP frame offset | 8 bits | The Next MBS MAP frame offset value is lower 8 bits of the frame number in which the BS shall transmit the next MBS MAP frame. |
| } | | |
| } | | |
| If!(byte boundary){ | | |
| Padding Nibble | variable | Padding to reach byte boundary |
| } | | |
| } | | |

TABLE 22

| Syntax | Size | Notes |
|---|---|---|
| MBS_MAP_IE( ) { | | |
| Extended DIUC | 4 bits | MBS_MAP = ? |

TABLE 22-continued

| Syntax | Size | Notes |
| --- | --- | --- |
| Length | 4 bits | |
| Multicast CID | 12 bits | 12 LSB of CID for multicast |
| MBS Zone identifier | 7 bits | MBS Zone identifier corresponds to the identifier provided by the BS at connection initiation |
| MBS Traffic Indication | 1 bit | 0: MBS data is not transmitted<br>1: MBS data is transmitted |
| If (MBS Traffic Indication) { | | |
| DIUC | | |
| OFDMA Symbol Offset | 8 bits | The offset of the OFDMA symbol in which the burst starts, measured in OFDMA symbols from beginning of the downlink frame in which the DL-MAP is transmitted. |
| Subchannel offset | 6 bits | The lowest index OFDMA shbchannel used for carrying the burst, starting from subchannel 0. |
| Boosting | 3 bits | 000: normal (not boosted)<br>001: +6 dB<br>010: −6 dB<br>011: +9 dB<br>100: +3 dB<br>101: −3 dB<br>110: −9 dB<br>111: −12 dB |
| NO. OFDMA symbols | 6 bits | |
| NO. Subchannels | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |
| SLC_3_indication | 1 bit | Used to notify sleep mode class 3 is used for single BS MBS |
| If(SLC_3_indication = 0) { | | |
| Next MBS Frame offset | 8 bits | The Next MBS frame offset value is lower 8 bits of the frame number in which the BS shall transmit the next MBS frame. |
| Next MBS OFDMA Symbol offset | 8 bits | The offset of the OFDMA symbol in which the next MBS zone starts, measured in OFDMA symbols from the beginning of the downlink frame in which the MBS-MAP is transmitted. |
| } | | |
| } else { | | |
| Next MBS MAP frame offset | 8 bits | The Next MBS MAP frame offset value is lower 8 bits of the frame number in which the BS shall transmit the next MBS MAP frame. |
| } | | |
| } | | |
| If!(byte boundary){ | | |
| Padding Nibble | variable | Padding to reach byte boundary |
| } | | |
| } | | |

TABLE 23

| Syntax | Size | Notes |
| --- | --- | --- |
| MBS_MAP_IE( ) { | | |
| Extended DIUC | 4 bits | MBS_MAP = 0x05 |
| Length | 4 bits | |
| Multicast CID | 12 bits | 12 LSB of CID for multicast |
| MBS Zone identifier | 7 bits | MBS Zone identifier corresponds to the identifier provided by the BS at connection initiation |
| Macro diversity enhanced | 1 bit | 0 = Non Macro-Diversity enhanced zone<br>1 = Macro-Diversity enhanced zone |
| If(Macro diversity enhanced = 1){ | | |
| MBS Traffic Indication | 1 bit | 0: MBS data is not transmitted<br>1: MBS data is transmitted |
| If(Macro Traffic Indication = 1){ | | |
| Permutation | 2 bits | 0b00 = PUSC permutation,<br>0b01 = FUSC permutation,<br>0b10 = Optional FUSC permutation,<br>0b11 = Adjacent subcarrier permutation |
| Idcell | 6 bits | |
| OFDMA Symbol Offset | 7 bits | OFDMA symbol offset with respect to start of the MBS region |
| DIUC change indication | 1 bit | Used to indicate DIUC change is included |
| If(DIUC change indication = 1) { | | |
| Reserved | 1 bit | |
| Boosting | 3 bits | |
| DIUC | 4 bits | |
| No. Subchannels | 6 bits | |
| NO. OFDMA symbols | 2 bits | |
| } else { | | |
| DIUC | 4 bits | |
| OFDMA Symbol Offset | 8 bits | The offset of the OFDMA symbol in which the burst starts, measured in OFDMA symbols from beginning of the downlink frame in which the DL-MAP is transmitted. |
| Subchannel offset | 6 bits | The lowest index OFDMA shbchannel used for carrying the burst, starting from subchannel 0. |
| Boosting | 3 bits | 000: normal (not boosted)<br>001: +6 dB<br>010: −6 dB<br>011: +9 dB<br>100: +3 dB<br>101: −3 dB<br>110: −9 dB<br>111: −12 dB |
| SLC_3_indication | 1 bit | Used to notify sleep mode class 3 is used for single BS MBS |
| NO. OFDMA symbols | 6 bits | |
| NO. Subchannels | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |
| If(SLC_3_indication = 0) { | | |
| Next MBS Frame offset | 8 bits | The Next MBS frame offset value is lower 8 bits of the frame number in which the BS shall transmit the next MBS frame. |

TABLE 23-continued

| Syntax | Size | Notes |
| --- | --- | --- |
| Next MBS OFDMA Symbol offset | 8 bits | The offset of the OFDMA symbol in which the next MBS portion starts, measured in OFDMA symbols from the beginning of the downlink frame in which the MBS-MAP is transmitted. |
| } } } else { | | |
| Next MBS MAP frame offset | 8 bits | The Next MBS MAP frame offset value is lower 8 bits of the frame number in which the BS shall transmit the next MBS MAP frame. |
| } } If!(byte boundary){ | | |
| Padding Nibble | variable | Padding to reach byte boundary |
| } } | | |

Parameters of MBS MAP IE newly added to the related art MBS MAP information element are 'MBS Traffic Indication' and 'Next MBS MAP frame offset'.

The present invention is characterized in that, if a mobile subscriber station having made a request for a reception of MBS data does not exist within a cell, a base station does not transmit the corresponding MBS data to a mobile subscriber station using a radio resource. 'MBS Traffic Indication' is an indicator indicating whether a base station is transmitting MBS data. If a mobile subscriber station having made a request for MBS does not exist within a base station, 'MBS Traffic Indication' is set to 0 and the corresponding MBS data is not transmitted to a mobile subscriber station. Yet, in case that a mobile subscriber station makes a request for a corresponding MBS reception to a base station or in case that MBS feedback information is received from an idle-mode mobile subscriber station, the base station sets 'MBS Traffic Indication' bit to 1 and transmits MAP information (DIUC, symbol offset, subchannel offset, etc.) for transmission of corresponding MBS data and scheduling information for a next MBS frame to the mobile subscriber station in a broadcast format.

'Next MBS MAP frame offset' indicates a frame offset value of next MBS MAP information. So, after having received MBS feedback information from an idle-mode mobile subscriber station, a base station currently not transmitting MBS data can inform the idle-mode mobile subscriber station of MBS data scheduling information regarding when MBS data will be transmitted.

Table 24 shows an example of MBS feedback information transmitted to a base station by an idle-mode mobile subscriber station to make a request for location update and MBS data transmission to the base station in case that the idle-mode mobile subscriber station moves away into another base station within MBS zone in multiple base station MBS supporting macro-diversity.

TABLE 24

| Name | Type | Length | Value |
| --- | --- | --- | --- |
| MBS Feedback Information | TBD | 3 byte | MBS information Bits 15:0 - MBS CID Bits 23:16 - MBS Zone ID |

BRIEF DESCRIPTION OF THE DRAWINGS

FIG. 10 is a diagram of an ex format of a feedback header.

FIG. 18 is a diagram of an example of an MBS feedback header including MBS feedback information according to one embodiment of the present invention.

BEST MODE FOR CARRYING OUT THE INVENTION

The aforesaid objectives, features and advantages of the invention will be set forth in the description which follows, and in part will be apparent from the description. Reference will now be made in detail to one preferred embodiment of the present invention, examples of which are illustrated in the accompanying drawings.

Figure 1:
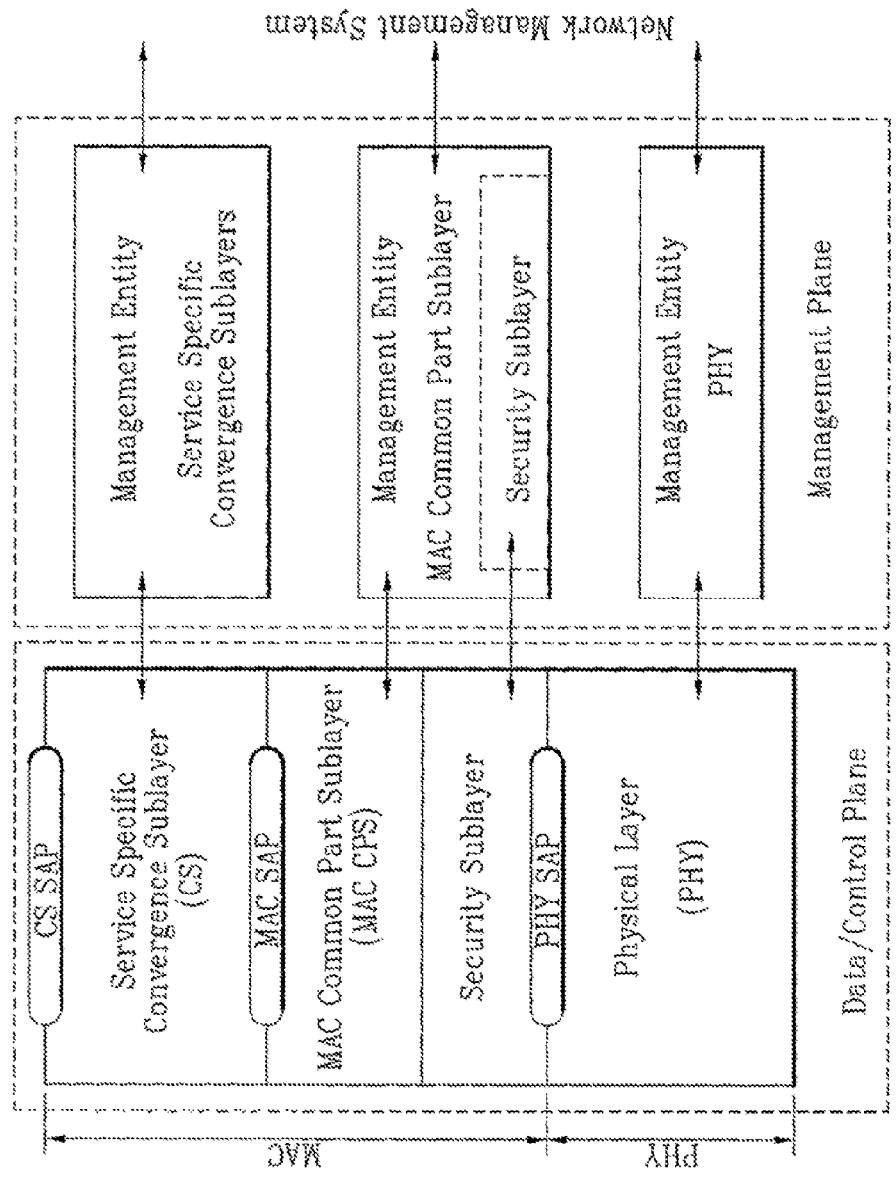
FIG. 1 is a diagram of protocol layer architecture of a broadband wireless access system.
Figure 2:
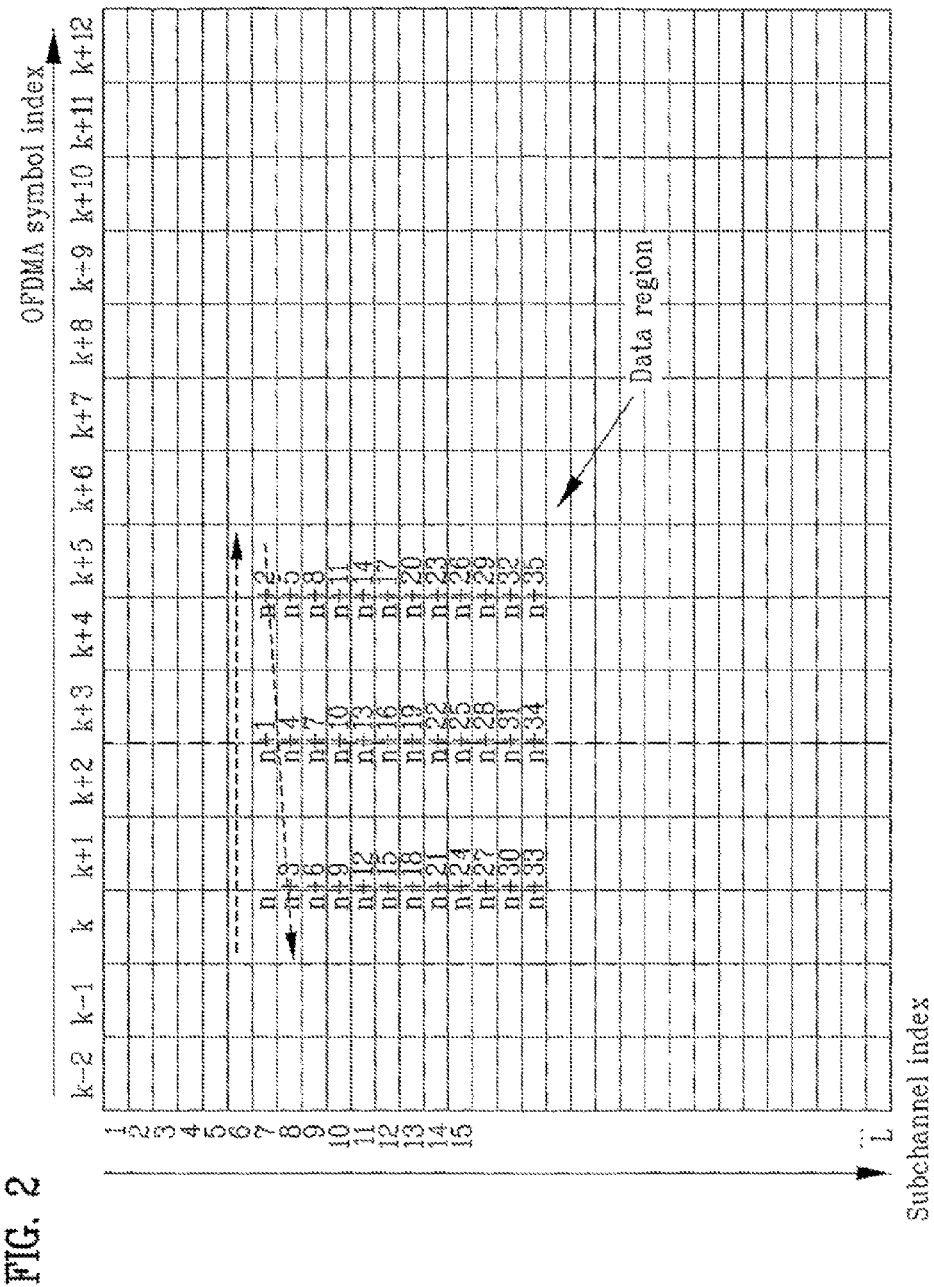
FIG. 2 is a diagram of an example of a process for mapping FEC block to OFDMA sub-channel and OFDM symbol.
Figure 3:
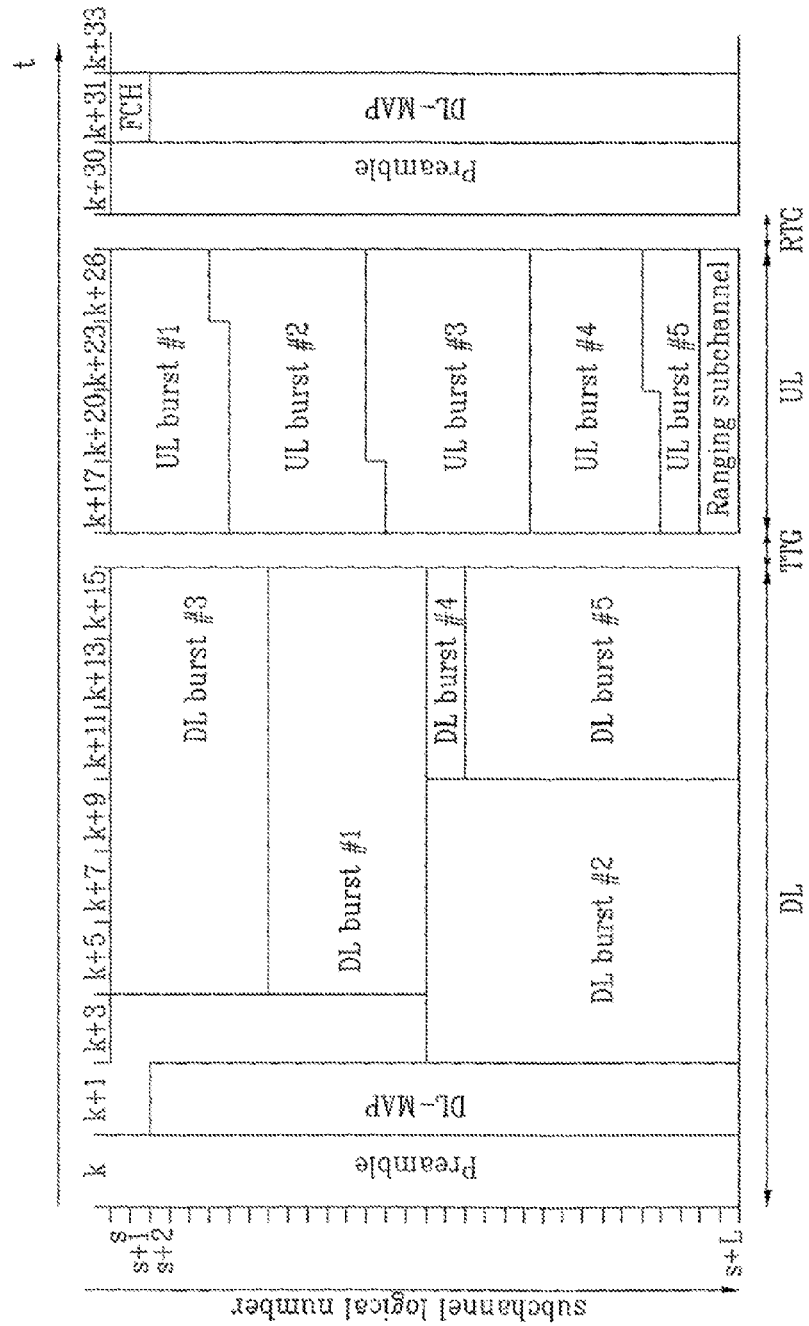
FIG. 3 is a diagram of a frame structure of an OFDMA physical layer in a broadband wireless access system.
Figure 4A:
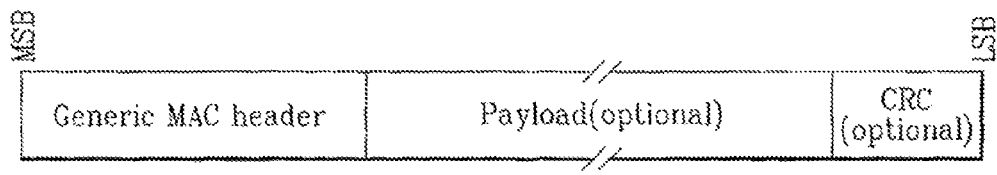
FIG. 4A is a diagram of a format of MAC PDU.
Figure 4B:
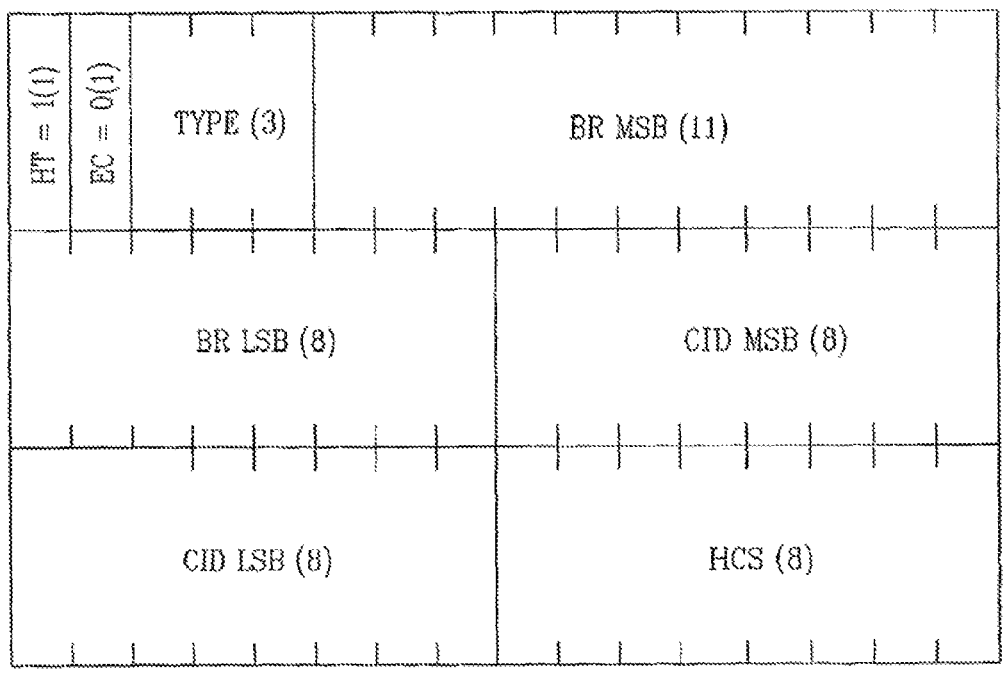
FIG. 4B is a diagram of an example of a band request header.
Figure 4C:
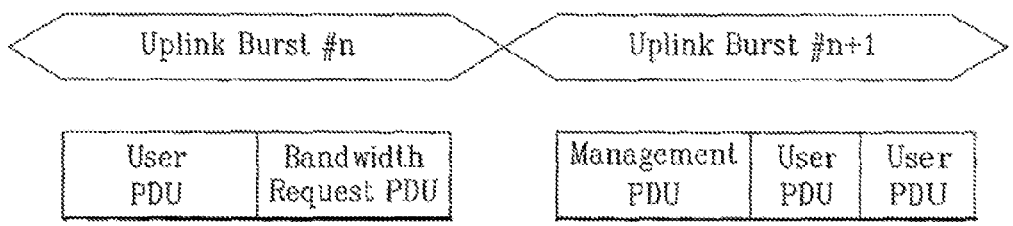
FIG. 4C is a diagram of an exemplary structure that a plurality of MAC PDUs concatenated with each other to be transmitted as one uplink burst.
Figure 5:
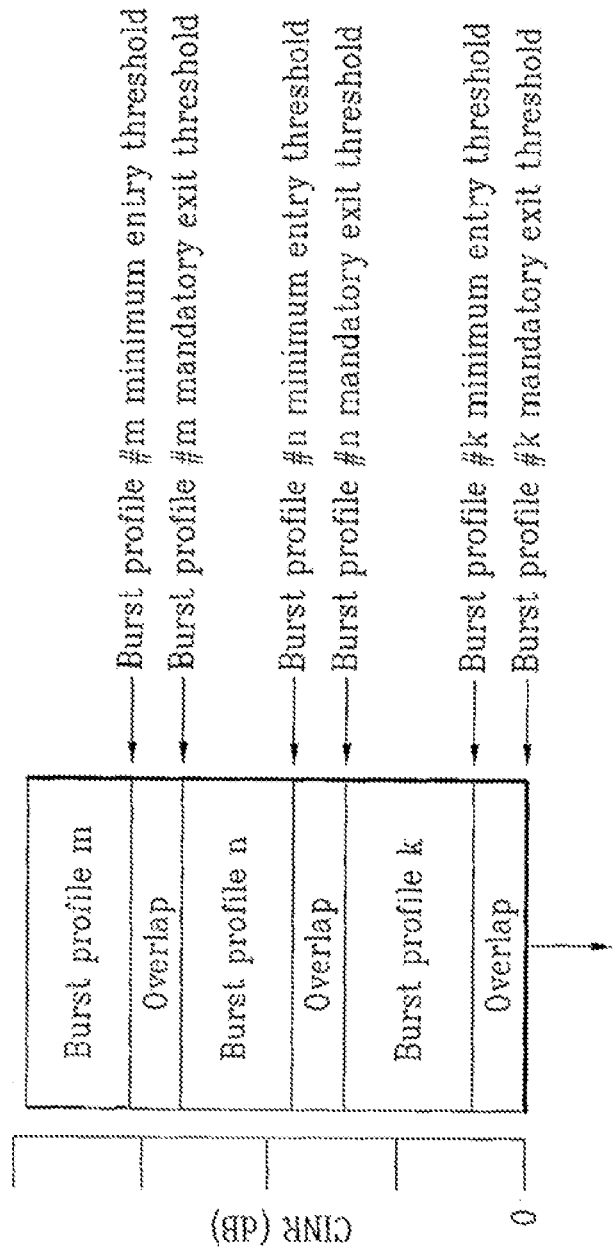
FIG. 5 is a diagram for explaining a relation between CINR and a burst profile according to DIUC.
Figure 6:
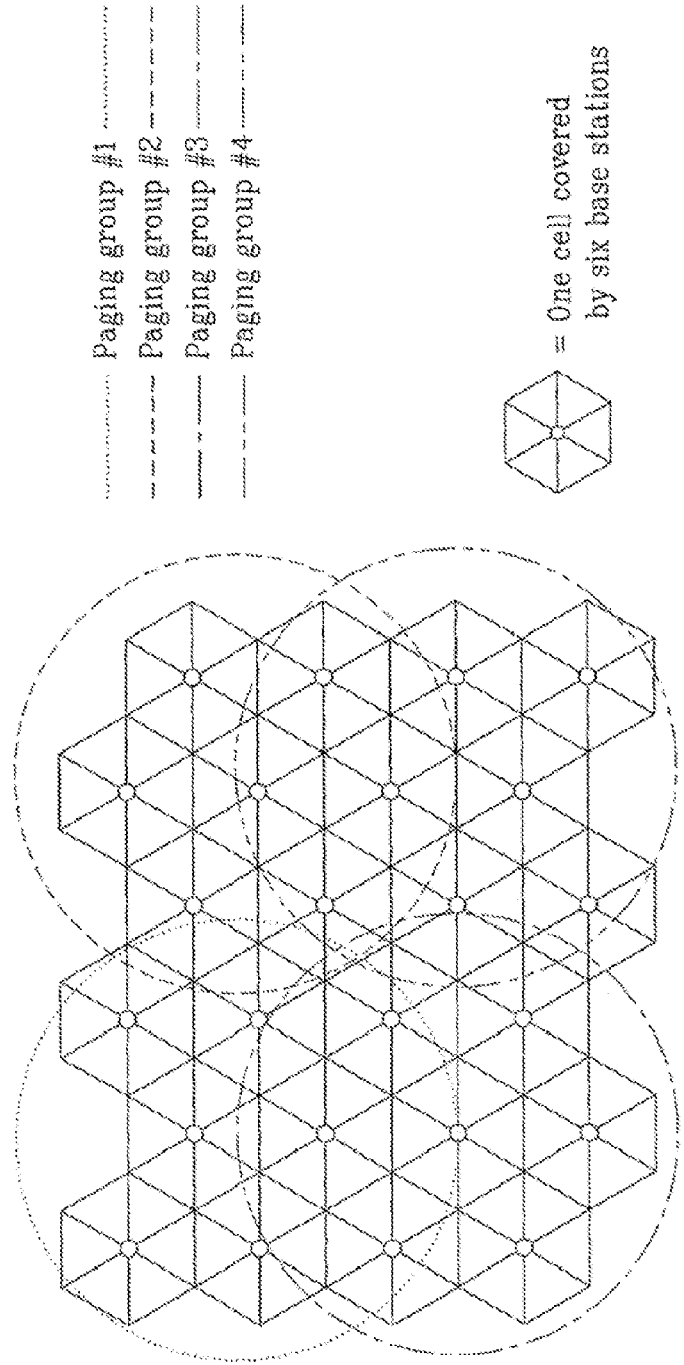
FIG. 6 is a diagram of an example that a plurality of base stations supporting idle mode belong to a paging group to construct a paging zone.
Figure 7:
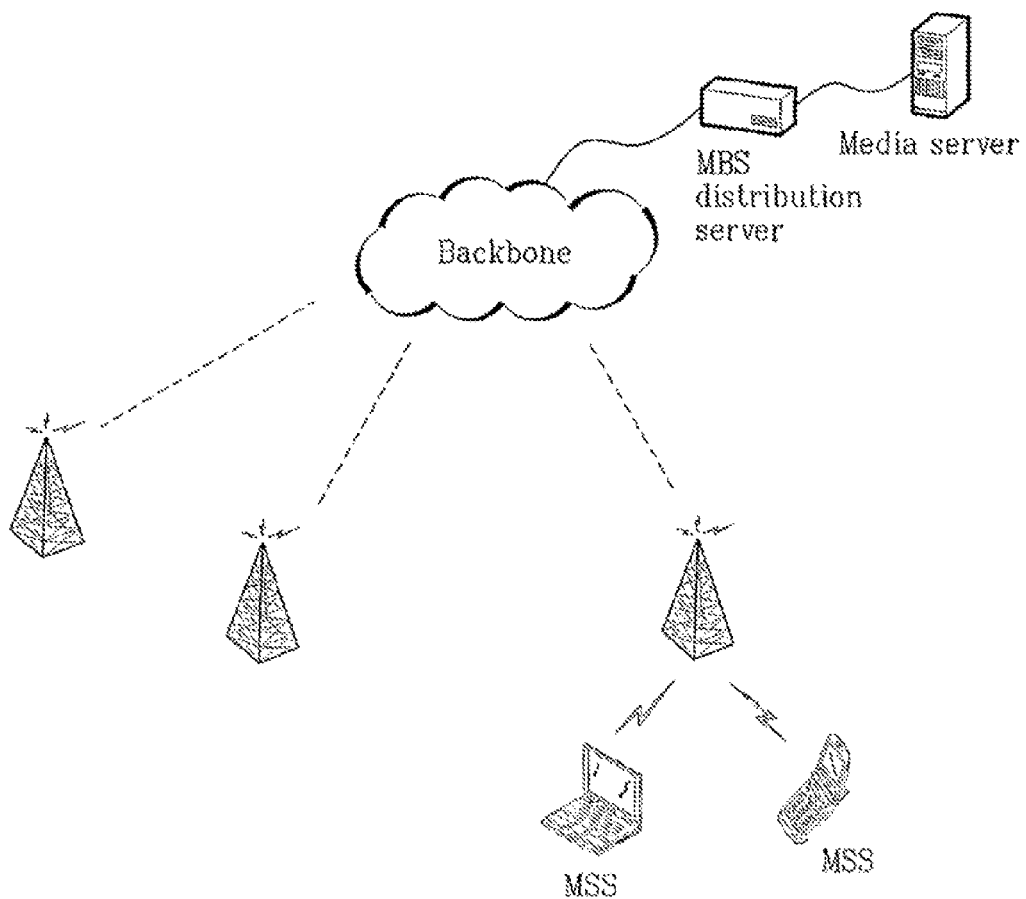
FIG. 7 and FIG. 8 are diagrams of examples of a reference model for MBS of a broadband wireless access system.
Figure 8:
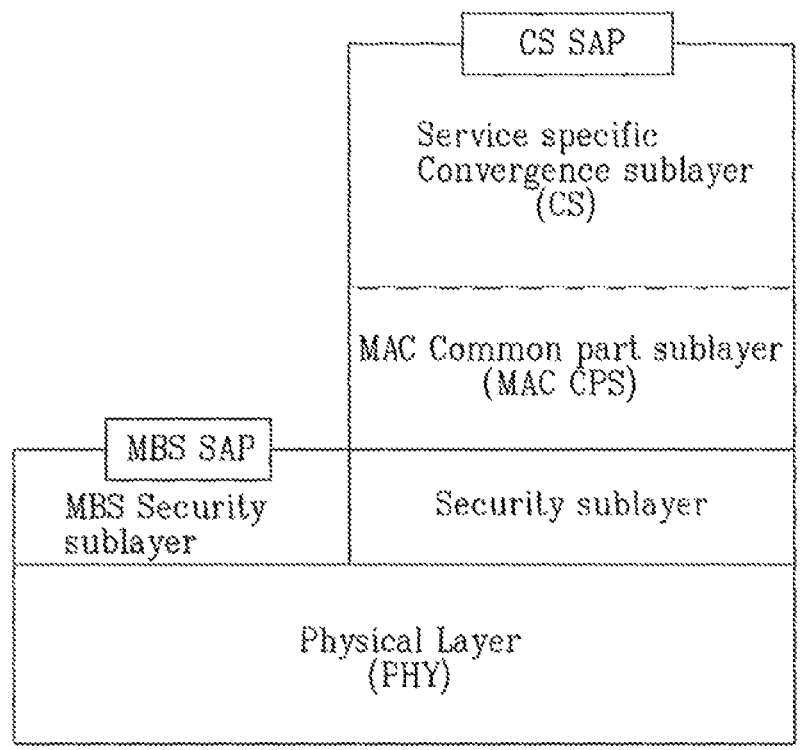
Figure 9A:
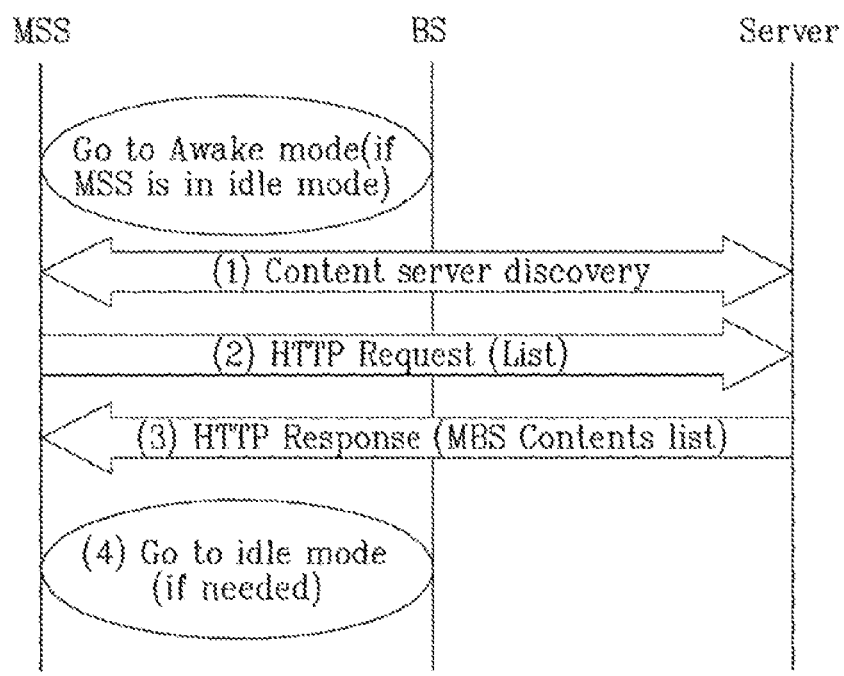
FIG. 9A and FIG. 9B are flowcharts for explaining an MBS operation of a broadband wireless access system.
Figure 9B:
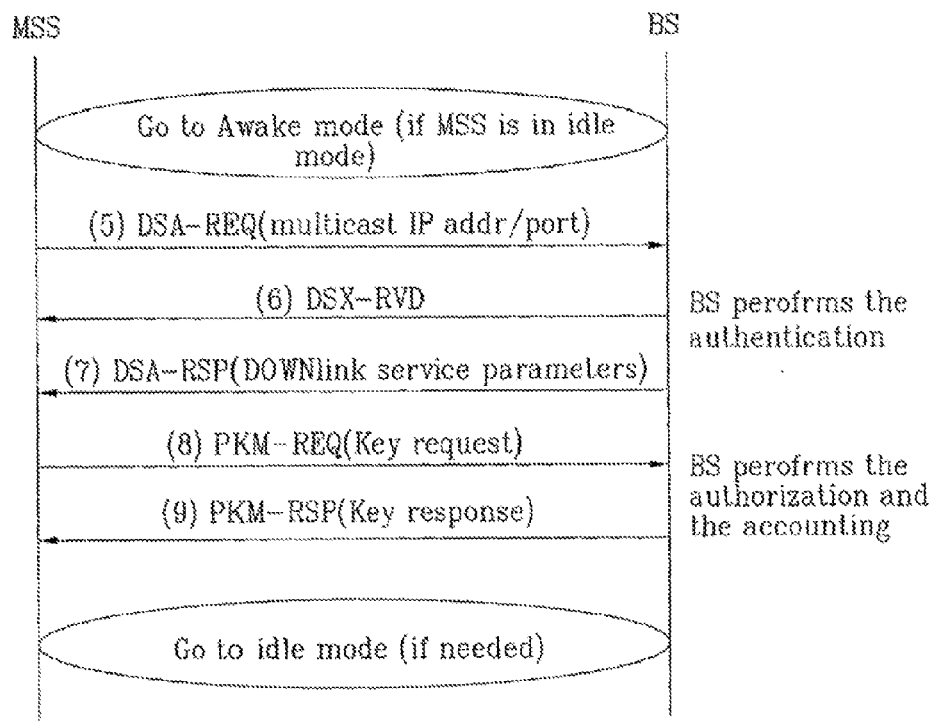
Figure 11:
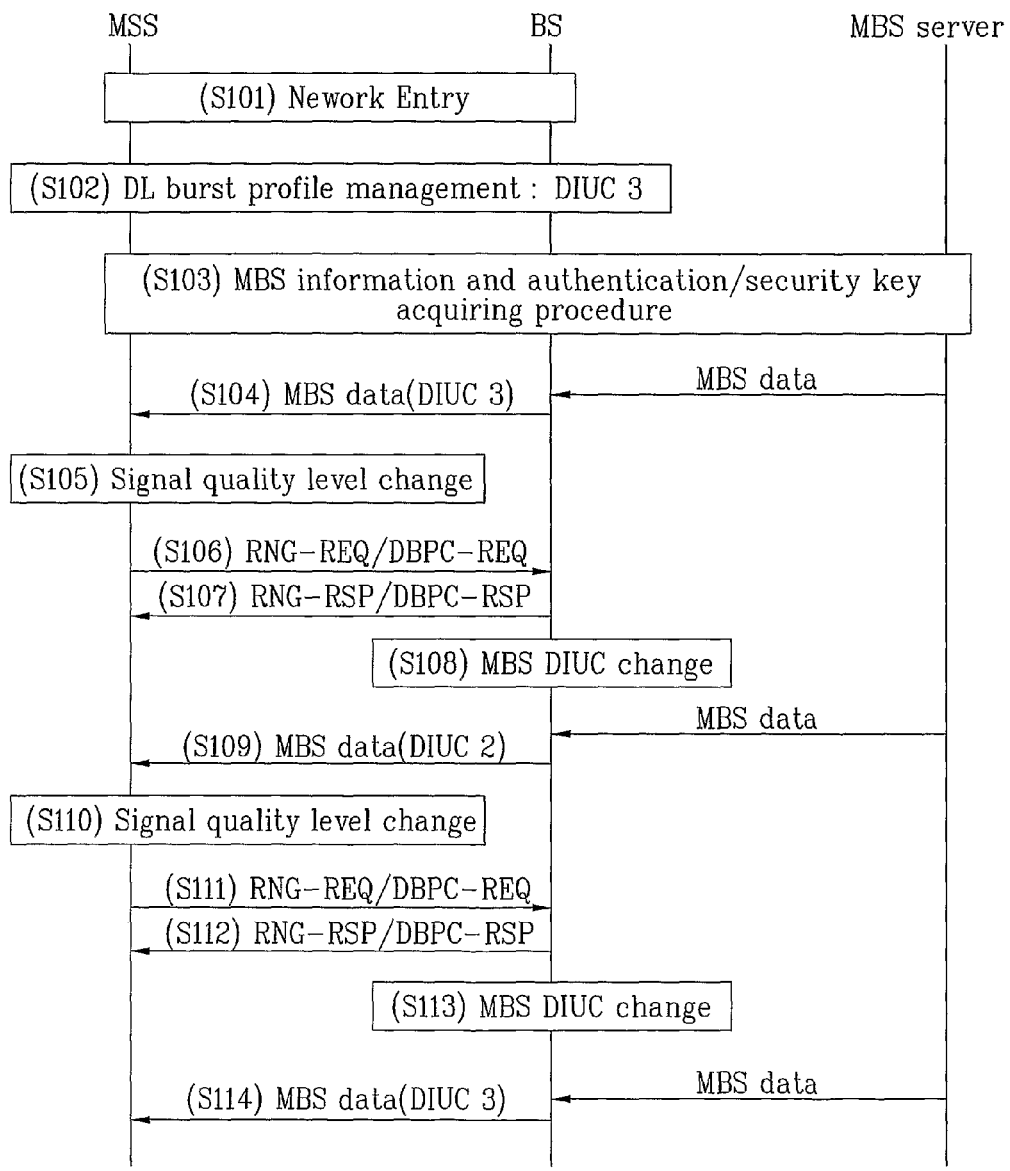
FIG. 11 is a flowchart of one preferred embodiment of the present invention.

FIG. 11 is a flowchart of one preferred embodiment of the present invention. An Embodiment of FIG. 11 shows a process that a base station changes an MBS burst profile if there is just one mobile subscriber station receiving MBS data from the base station and if a downlink signal quality level is different from a downlink burst profile level while the mobile subscriber station receives the MBS data.

Referring to FIG. 11, a mobile subscriber station performs a network entry procedure with a base station [S101]. The mobile subscriber station updates a downlink burst profile suitable for its reception according to a downlink signal quality received from the base station by exchanging RNG-REQ/RSP or DPBC-REQ/RSP message with the base station and receives downlink data from the base station via an updated burst profile (e.g., DIUC 3) [S102]. To receive MBS, the mobile subscriber station performs an authentication procedure and an MBS associated parameter acquiring procedure via an MBS generating procedure with the base station and an MBS server [S103].

The base station delivers MBS MAP information (MBS CID, MBS zone ID, MBS Traffic Indication, symbol/subchannel offset, number of symbol/subchannel, DIUC, next MBS frame offset, etc.) via MBS MAP IE such as Table 21, Table 22 and Table 23, and transmits MBS data to the mobile subscriber station via MBS CID by configuring a downlink burst profile (DIUC 3) for MBS data transmission with reference to a downlink burst profile (DIUC 3) of the mobile subscriber station having made a request for MBS reception [S104].

As a downlink channel signal quality of the mobile subscriber station becomes degraded, if a necessity to update a downlink burst profile delivered to the mobile subscriber station from the base station takes place [S105], the mobile subscriber station delivers preferred downlink burst profile information (e.g., DIUC 2) to the base station via a message such as RNG-REQ, DPBC-REQ and the like [S106]. Having received a downlink burst profile change request from the mobile subscriber station, the base station delivers changed downlink burst profile information to the mobile subscriber station via such a message as RNG-RSP, DPBC-RSP and the like [S107].

In this case, the base station compares the changed downlink burst profile (DIUC 2) to a current MBS burst profile (DIUC 3). If the MBS burst profile needs to be changed, the base station changes the MBS burst profile into the changed downlink burst profile (DIUC 2) of the corresponding mobile subscriber station [S108]. In the embodiment of FIG. 11, one mobile subscriber station receives MBS data from a base station, for example. So, a profile of MBS data burst is changed to correspond to a downlink burst profile change of the corresponding mobile subscriber station.

The base station delivers MBS MAP information (MBS CID, MBS zone ID, MBS Traffic Indication, symbol/subchannel offset, number of symbol/subchannel, DIUC, next MBS frame offset, etc.) via such MBS MAP IE proposed by the present invention as Table 21, Table 22 and Table 23 and transmits MBS data to the mobile subscriber station with the changed MBS burst profile (DIUC 2) via MBS CID [S109].

As the downlink channel signal quality of the mobile subscriber station is improved, if necessity to update a downlink burst profile delivered to the mobile subscriber station itself takes place [S110], the mobile subscriber station transmits preferred downlink burst profile information (DIUC 3) to the base station via such a message as RNG-REQ, DPBC-REQ and the like [S111]. The base station having received a downlink burst profile change request from the mobile subscriber station delivers the changed burst profile information to the mobile subscriber station via such a message as RNG-RSP, DPBC-RSP and the like [S112].

In this case, the base station compares the changed downlink burst profile (DIUC 3) to a current MBS burst profile (DIUC 2). If the MBS burst profile needs to be changed, the base station changes the MBS burst profile into the changed downlink burst profile (DIUC 3) of the mobile subscriber station [S113].

The base station delivers MBS MAP information (MBS CID, MBS zone ID, MBS Traffic Indication, symbol/subchannel offset, number of symbol/subchannel, DIUC, next MBS frame offset, etc.) via such MBS MAP IE as Table 21, Table 22 and Table 23 and transmits MBS data to the mobile subscriber station with the changed MBS burst profile (DIUC 3) via MBS CID [S114].

Figure 12:
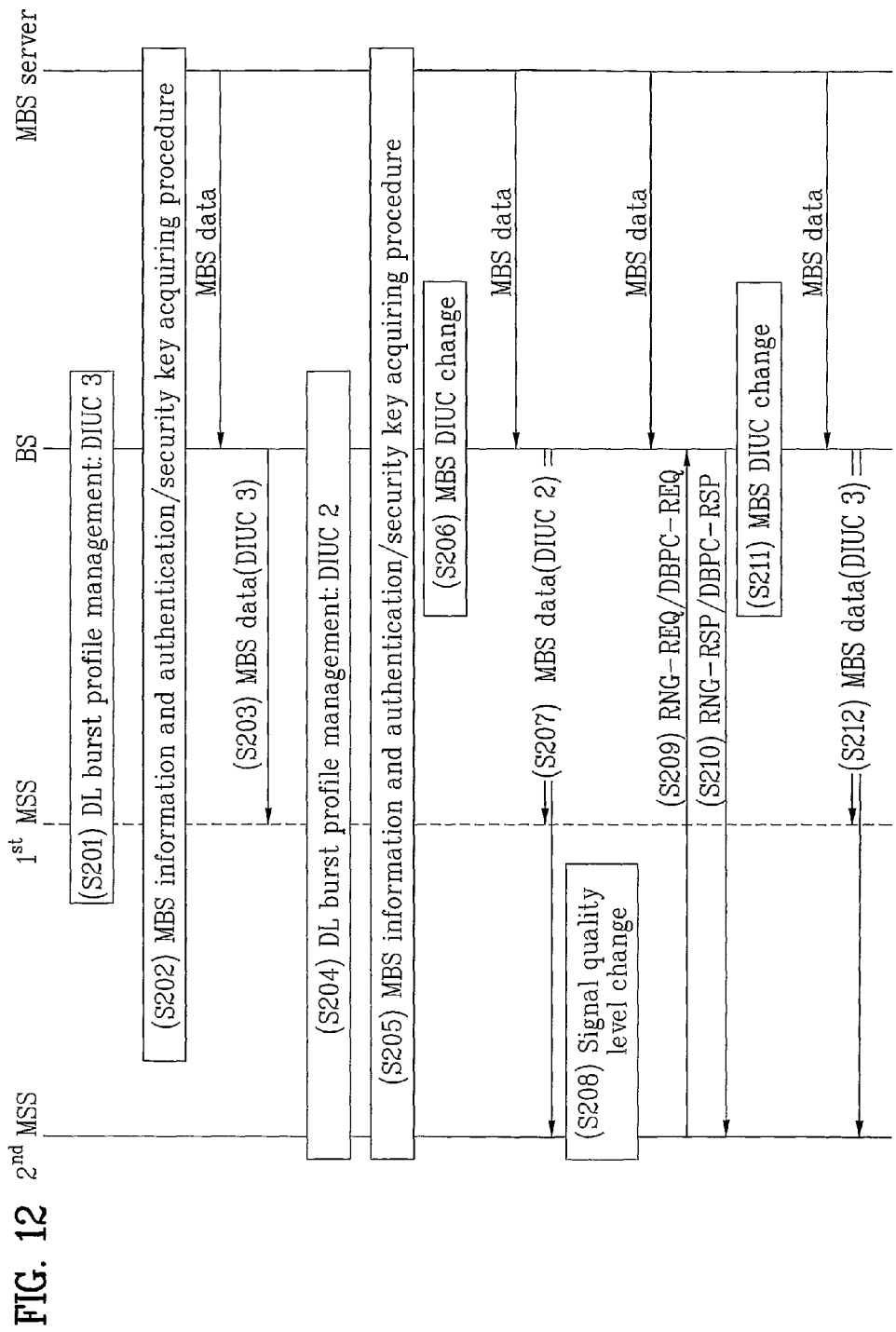
FIG. 12 is a flowchart of another preferred embodiment of the present invention.

FIG. 12 is a flowchart of another preferred embodiment of the present invention. In an embodiment of FIG. 12, in case that at least two mobile subscriber stations receive MBS service data from a base station, in a process that the base station updates downlink burst profiles of the mobile subscriber stations, the downlink burst profiles are compared to an MBS burst profile so that the MBS burst profile is changed to correspond to a mobile subscriber station using a most robust downlink burst profile.

A first mobile subscriber station updates a downlink burst profile suitable for its reception according to a downlink signal quality received from a base station by exchanging RNG-REQ/RSP or DPBC-REQ/RSP message with the base station and receives downlink data from the base station via an updated burst profile (DIUC 3) [S201]. To receive MBS, the first mobile subscriber station performs an authentication procedure and an MBS associated parameter acquiring procedure via an MBS generating procedure with the base station and an MBS server [S202].

The base station delivers MBS MAP information (MBS CID, MBS zone ID, MBS Traffic Indication, symbol/subchannel offset, number of symbol/subchannel, DIUC, next MBS frame offset, etc.) via MBS MAP IE such as Table 21, Table 22 and Table 23, and transmits MBS data to the mobile subscriber station via MBS CID by configuring a burst profile (DIUC 3) for MBS data transmission with reference to a downlink burst profile (DIUC 3) of the mobile subscriber station having made a request for MBS reception [S203].

A second mobile subscriber station updates a downlink burst profile suitable for its reception according to a downlink signal quality received from a base station by exchanging RNG-REQ/RSP or DPBC-REQ/RSP message with the base station and receives downlink data from the base station via an updated burst profile (DIUC 3) [S204].

To receive a specific MBS, the second mobile subscriber station performs an authentication procedure and an MBS associated parameter acquiring procedure via an MBS generating procedure with the base station and an MBS server [S205].

The base station compares the downlink burst profiles of the mobile subscriber stations having requested the MBS reception and then selects a most robust downlink burst profile (e.g., downlink burst profile DIUC 2 of the second mobile subscriber station) as an MBS burst profile [S206].

The base station delivers MBS MAP information (MBS CID, MBS zone ID, MBS Traffic Indication, symbol/subchannel offset, number of symbol/subchannel, DIUC, next MBS frame offset, etc.) via such MBS MAP IE proposed by the present invention as Table 21, Table 22 and Table 23 and transmits MBS data to the mobile subscriber station via MBS CID by configuring the most robust profile (DIUC 2) of the downlink burst profiles of the mobile subscriber stations having requested the MBS reception as a burst profile (DIUC 2) of MBS data [S207].

As the downlink channel signal quality of the second mobile subscriber station is improved, if necessity to update a downlink burst profile delivered to the second mobile subscriber station itself takes place [S208], the second mobile subscriber station transmits preferred downlink burst profile information (DIUC 3) to the base station via such a message as RNG-REQ, DPBC-REQ and the like [S209].

The base station having received a downlink burst profile change request from the second mobile subscriber station delivers the changed burst profile information to the mobile subscriber station via such a message as RNG-RSP, DPBC-RSP and the like [S210].

As the second mobile subscriber station is receiving MBS data and since the most robust profile among the downlink burst profiles of the mobile subscriber stations receiving MBS is changed (DIUC 2 to DIUC 3), the base station changes the MBS burst profile (DIUC 3) [S211].

The base station delivers MBS MAP information (MBS CID, MBS zone ID, MBS Traffic Indication, symbol/sub-channel offset, number of symbol/subchannel, DIUC, next MBS frame offset, etc.) via such MBS MAP IE as Table 21, Table 22 and Table 23 and transmits MBS data to the mobile subscriber station with the changed MBS burst profile (DIUC 3) via MBS CID [S212].

Figure 13:
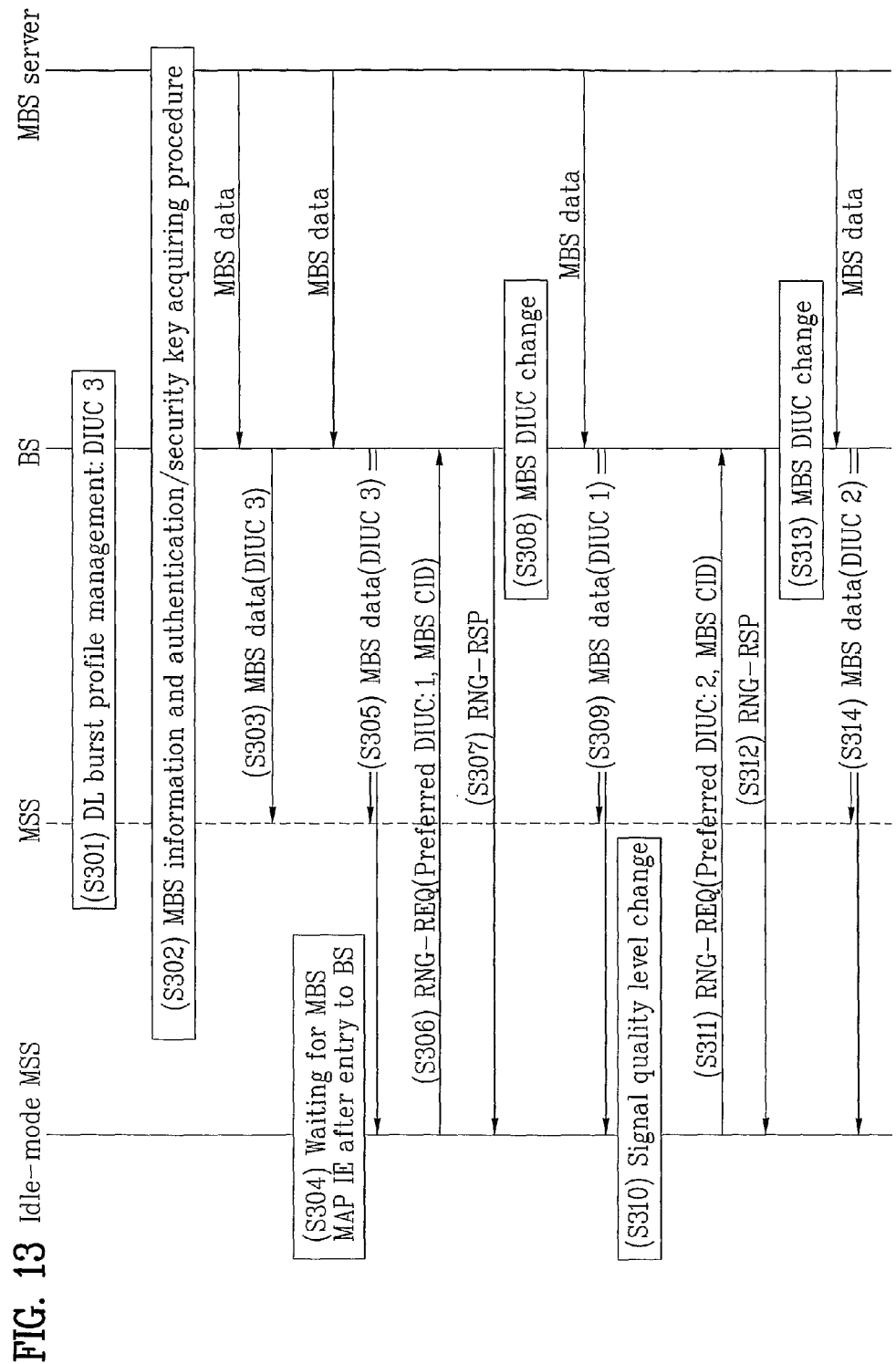
FIG. 13 is a flowchart of another preferred embodiment of the present invention.

FIG. 13 is a flowchart of another preferred embodiment of the present invention. In an embodiment of FIG. 13, in case that a normal/sleep mode mobile subscriber station exists within a base station, an idle-mode mobile subscriber station operates to receive MBS.

First of all, a mobile subscriber station updates a downlink burst profile suitable for its reception according to a downlink signal quality received from a base station by exchanging RNG-REQ/RSP or DPBC-REQ/RSP message with the base station and receives downlink data from the base station via an updated burst profile (DIUC 3) [S301].

To receive MBS, the mobile subscriber station performs an authentication procedure and an MBS associated parameter acquiring procedure via an MBS generating procedure with the base station and an MBS server [S302].

The base station delivers MBS MAP information (MBS CID, MBS zone ID, MBS Traffic Indication, symbol/sub-channel offset, number of symbol/subchannel, DIUC, next MBS frame offset, etc.) via MBS MAP IE such as Table 21, Table 22 and Table 23, and transmits MBS data to the mobile subscriber station via MBS CID by configuring a burst profile (DIUC 3) of MBS data with reference to a downlink burst profile (DIUC 3) of the mobile subscriber station having made a request for MBS reception [S303].

Having entered the base station, an idle-mode mobile subscriber station having received MBS in a previous base station waits for MBS MAP IE to receive MBS information [S304].

The base station delivers MBS MAP information (MBS CID, MBS zone ID, MBS Traffic Indication, symbol/sub-channel offset, number of symbol/subchannel, DIUC, next MBS frame offset, etc.) via MBS MAP IE such as Table 21, Table 22 and Table 23, and transmits MBS data to the mobile subscriber station via MBS CID by configuring a downlink burst profile (DIUC 3) for MBS data transmission with reference to downlink burst profiles (DIUC 3) of the mobile subscriber stations receiving the MBS [S305].

In case of deciding that the MBS reception is possible through MBS MAP information, the idle-mode mobile subscriber station includes preferred downlink burst profile information (preferred DIUC, CCC, MBS CID) to receive specifically and TLV parameters such as a location update indicator, a paging controller ID and the like in RNG-REQ message and then makes a request for MBS data transmission to the base station together with a location update request [S306].

The base station makes a request for a location update of the idle-mode mobile subscriber station to a paging controller. If receiving a response indicating that the location update was successfully performed from the paging controller, the base station compares downlink burst profiles of other mobile subscriber stations receiving the MBS to the downlink burst profile requested by the idle-mode mobile subscriber station.

The base station sets a most robust burst profile as information of an MBS burst profile in RNG-RSP message and then delivers it together with a location update result [S307].

Since the downlink burst profile (DIUC 1) requested by the idle-mode mobile subscriber station is the most robust burst profile, the base station changes the MBS burst profile [S308].

The base station delivers MBS MAP information (MBS CID, MBS zone ID, MBS Traffic Indication, symbol/sub-channel offset, number of symbol/subchannel, DIUC, next MBS frame offset, etc.) via such MBS MAP IE proposed by the present invention as Table 21, Table 22 and Table 23 and transmits MBS data to the mobile subscriber station via MBS CID by configuring the most robust profile (DIUC 1) as a burst profile (DIUC 1) of MBS data based on the downlink burst profiles of the mobile subscriber stations having requested the MBS reception and MBS feedback information received from the idle-mode mobile subscriber stations [S309].

As the downlink channel signal quality of the idle-mode mobile subscriber station is improved, if necessity to update a downlink burst profile delivered to the idle-mode mobile subscriber station itself takes place [S310], the idle-mode mobile subscriber station includes preferred downlink burst profile information (preferred DIUC 2) as TLV parameter like Table 12 in RNG-REQ message and then delivers the message to the base station [S311].

The base station compares downlink burst profiles of other mobile subscriber stations receiving the MBS to the downlink burst profile requested by the idle-mode mobile subscriber station and then sets the most robust burst profile as information of MBS burst profile. The base station delivers the information to the mobile subscriber station via RNG-RSP message [S312].

Since the MBS burst profile (DIUC 2) requested by the idle-mode mobile subscriber station is the most robust burst profile, the base station changes the MBS burst profile (DIUC 2) [S313].

The base station delivers MBS MAP information (MBS CID, MBS zone ID, MBS Traffic Indication, symbol/sub-channel offset, number of symbol/subchannel, DIUC, next MBS frame offset, etc.) via such MBS MAP IE proposed by the present invention as Table 21, Table 22 and Table 23 and transmits MBS data to the mobile subscriber station via MBS CID by configuring the most robust profile (DIUC 2) as a burst profile (DIUC 2) for MBS data transmission based on the downlink burst profiles of the mobile subscriber stations having requested the MBS reception and MBS feedback information received from the idle-mode mobile subscriber stations [S314].

In the present embodiment, the example covers one normal or sleep mode mobile subscriber station and one idle-mode mobile subscriber station only. Yet, in case that a plurality of normal/sleep mode mobile subscriber stations and a plurality of idle-mode mobile subscriber stations exist within an MBS base station, the most robust one of downlink burst profiles of the mobile subscriber stations can be configured as MBS burst profile.

Figure 14:
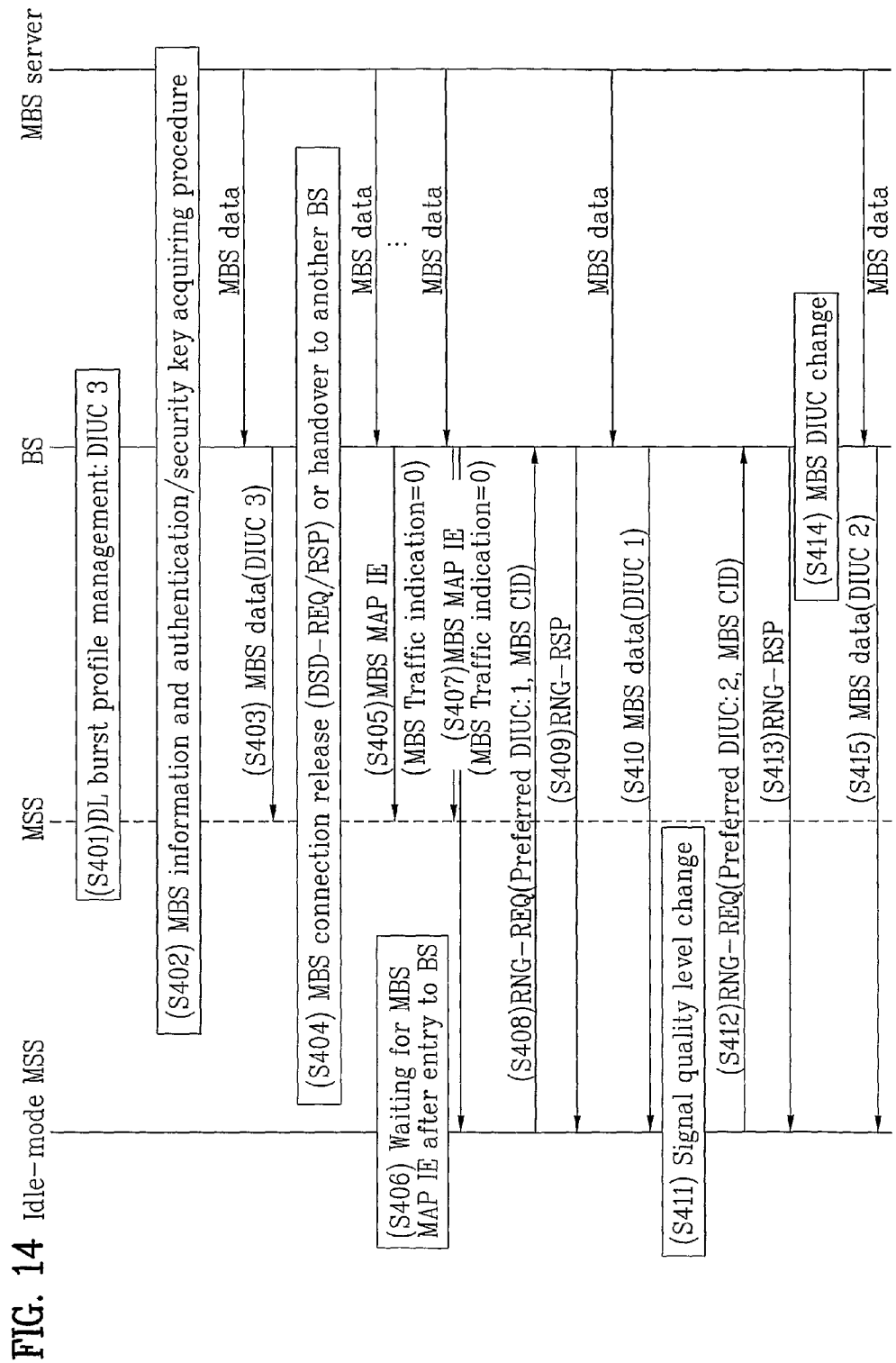
FIG. 14 is a flowchart of another preferred embodiment of the present invention.

FIG. 14 is a flowchart of another preferred embodiment of the present invention. In an embodiment of FIG. 14, in case that a base station capable of providing MBS does not transmit MBS data since a mobile subscriber station having made a request for an MBS reception does not exist within a cell, an idle-mode mobile subscriber station operated to receive MBS in moving away into a cell governed by the corresponding base station.

First of all, a mobile subscriber station updates a downlink burst profile suitable for its reception according to a downlink signal quality received from a base station by exchanging RNG-REQ/RSP or DPBC-REQ/RSP message with the base station and receives downlink data from the base station via an updated burst profile (DIUC 3) [S401].

To receive MBS, the mobile subscriber station performs an authentication procedure and an MBS associated parameter acquiring procedure via an MBS generating procedure with the base station and an MBS server [S402].

The base station delivers MBS MAP information (MBS CID, MBS zone ID, MBS Traffic Indication, symbol/sub-channel offset, number of symbol/subchannel, DIUC, next MBS frame offset, etc.) via MBS MAP IE such as Table 21, Table 22 and Table 23, and transmits MBS data to the mobile subscriber station via MBS CID by configuring a burst profile (DIUC 3) of MBS data with reference to a downlink burst profile (DIUC 3) of the mobile subscriber station having made a request for MBS reception [S403].

If a mobile subscriber station attempting to receive the MBS does not exist within a cell governed by the base station since mobile subscriber stations receiving MBS performs handover to another base station or release connections for the corresponding service via DSD-REQ/RSP [S404], the base station delivers MBS MAP information (MBS zone ID, MBS CID, indicator indicating non-presence of MBS Traffic, scheduling information of next MBS MAP information, etc.) via MBS MAP IE such as Table 21, Table 22 and Table 23 and does not transmit MBS data received from the MBS server not to use radio resources [S405].

Having entered the cell governed by the base station, an idle-mode mobile subscriber station having received MBS in a previous base station waits for MBS MAP IE to receive MBS information [S406]. The base station delivers MBS MAP information (MBS zone ID, MBS CID, indicator indicating non-presence of MBS Traffic, scheduling information of next MBS MAP information, etc.) via MBS MAP IE such as Table 21, Table 22 and Table 23 and does not transmit MBS data received from the MBS server not to use radio resources [S407].

In case of deciding that the MBS reception is possible via the MBS MAP information received from the base station, the idle-mode mobile subscriber station includes preferred downlink burst profile information (preferred DIUC, CCC, MBS CID) to receive specifically and TLV parameters such as a location update indicator, a paging controller ID and the like in RNG-REQ message and then makes a request for MBS data transmission to the base station together with a location update request [S408].

The base station makes a request for a location update of the idle-mode mobile subscriber station to a paging controller. If receiving a response indicating that the location update was successfully performed from the paging controller, the base station sets MBS burst profile information in RNG-RSP message together with a location update result and then delivers it to the idle-mode mobile subscriber station [S409].

The base station delivers MBS MAP information (MBS CID, MBS zone ID, MBS Traffic Indication, symbol/sub-channel offset, number of symbol/subchannel, DIUC, next MBS frame offset, etc.) via such MBS MAP IE proposed by the present invention as Table 21, Table 22 and Table 23 and transmits MBS data to the idle-mode mobile subscriber station via MBS CID by configuring a downlink burst profile (DIUC 1) for MBS data transmission based on MBS feedback information received from the idle-mode mobile subscriber station [S410].

As the downlink channel signal quality of the idle-mode mobile subscriber station is improved, if necessity to update a downlink burst profile delivered to the idle-mode mobile subscriber station itself takes place [S411], the idle-mode mobile subscriber station transmits preferred downlink burst profile information (preferred DIUC 2) to the base station [S412]. The downlink burst profile information can be delivered in a manner of being included in RNG-REQ message via TLV parameter such as Table 20.

The base station sets a downlink burst profile based on the MBS feedback information and then delivers it to the idle-mode mobile subscriber station via RNG-RSP message or the like [S413].

IT is changed into MBS burst profile according to the downlink burst profile (DIUC 2) requested by the idle-mode mobile subscriber station [S414]. The base station delivers MBS MAP information (MBS CID, MBS zone ID, MBS Traffic Indication, symbol/subchannel offset, number of symbol/subchannel, DIUC, next MBS frame offset, etc.) via such MBS MAP IE proposed by the present invention as Table 21, Table 22 and Table 23 and transmits MBS data to the mobile subscriber station via MBS CID by configuring the downlink burst profile (DIUC 2) for MBS data transmission based on the MBS feedback information received from the idle-mode mobile subscriber stations [S415].

In the present embodiment, the example covers one idle-mode mobile subscriber station only. Yet, in case that a plurality of idle-mode mobile subscriber stations enter an MBS base station, the most robust one of feedback information received from the mobile subscriber stations is preferably configured as an MBS burst profile.

Figure 15:
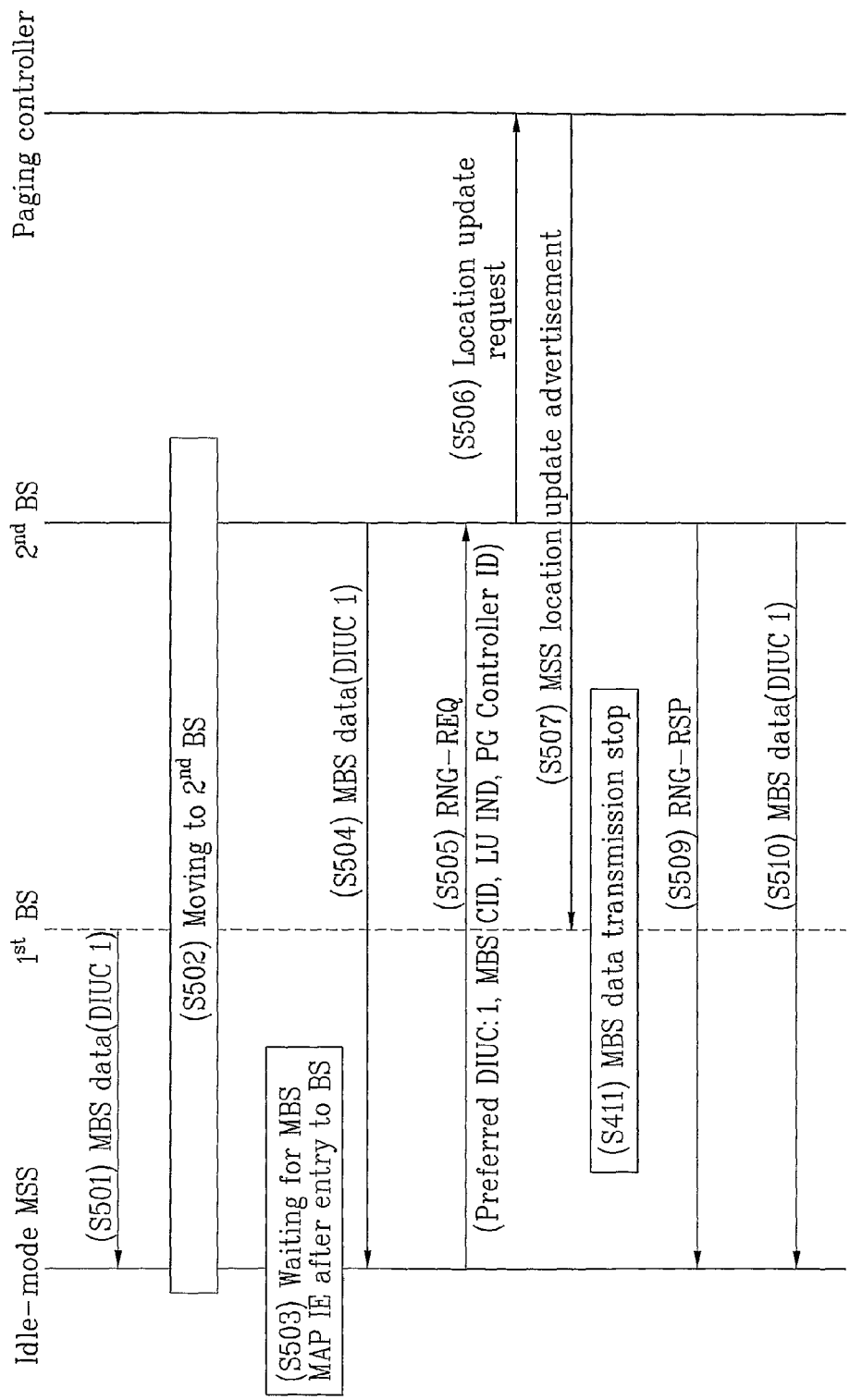
FIG. 15 is a flowchart of another preferred embodiment of the present invention.

FIG. 15 is a flowchart of another preferred embodiment of the present invention. FIG. 15 shows an operational process that an idle-mode mobile subscriber station moves away into a base station providing MBS to receive the MBS and a process that the base station decides whether to transmit MBS data by updating an existence or non-existence of the idle-mode mobile subscriber station receiving the MBS within the base station.

In case that an idle-mode mobile subscriber station moves away into a second base station [S502] while receiving MBS data from a first base station via DIUC 1 [S501], the idle-mode mobile subscriber station waits for MBS MAP IE reception to know whether the second base station provides MBS [S503].

The second base station informs mobile subscriber stations of information for a currently available MBS and information of an MBS that is being transmitted. The idle-mode mobile subscriber station receives the information for the MBS having been received from the first base station via MBS MAP from the second base station to know that DIUC 1 is currently transmitted [S504].

In case of deciding that an MBS reception is possible via the MBS MAP information received from the second base station, the idle-mode mobile subscriber station includes MBS burst profile information (preferred DIUC, CCC, MBS CID) to receive specifically such as Table 12 and TLV parameter such as a location update indicator, a paging controller ID and the like in RNG-REQ message and then makes a request for an MBS data transmission to the second base station together with a location update request [S505]. Even if the mobile subscriber station is enabled to receive MBS data without changing a currently transmitted MBS burst profile, it is preferable that the mobile subscriber station includes MBS burst profile information (preferred DIUC, CCC, MBS CID) and TLV parameter such as a location update indicator, a paging controller ID and the like in RNG-REQ message to deliver to the second base station.

The second base station delivers the location update request of the corresponding idle-mode mobile subscriber station to a paging controller [S506]. The paging controller informs the first base station that the mobile subscriber station has moved away into the second base station [S507].

In case of deciding that a mobile subscriber station currently receiving MBS does not exist within a base station, the first base station does not transmit MBS data [S508]. Yet, the first base station delivers MBS MAP information at a determined time to deliver MBS information that can be provided to mobile subscriber stations.

In case of receiving a response indicating that a location update was successfully performed from the paging controller, the second base station sets downlink burst profile information for MBS data transmission in RNG-RSP message together with a location update result and then delivers it to the idle-mode mobile subscriber station [S509].

The second base station delivers MBS MAP information (MBS CID, MBS zone ID, MBS Traffic Indication, symbol/subchannel offset, number of symbol/subchannel, DIUC next MBS frame offset, etc.) via MBS MAP IE proposed by the present invention such as Table 21, Table 22 and Table 23, and transmits MBS data to the idle-mode mobile subscriber station via MBS CID by configuring a burst profile (DIUC 1) of MBS data based on MBS feedback information received from the idle-mode mobile subscriber station [S510]. And, the idle-mode mobile subscriber station receives MBS data transmitted from the base station.

As explained with reference to FIG. 14 and FIG. 15, in case of the single base station MBS as well as multiple base station MBS, a base station providing MBS should update an existence or non-existence of an MBS receiving mobile subscriber station within a current base station area (via mobile subscriber station's handover, deregistration, service reception release, idle-mode mobile subscriber station's location update, etc.). And, an idle-mode mobile subscriber station enables an MBS providing base station to update a list of MBS receiving mobile subscriber stations by updating its location in case of moving away into another base station from a previous MBS providing base station. Moreover, in case of existing within a corresponding base station area, an idle-mode mobile subscriber station receiving single base station MBS data transmits preferred MBS burst profile information to the base station via MBS feedback information.

Figure 16:
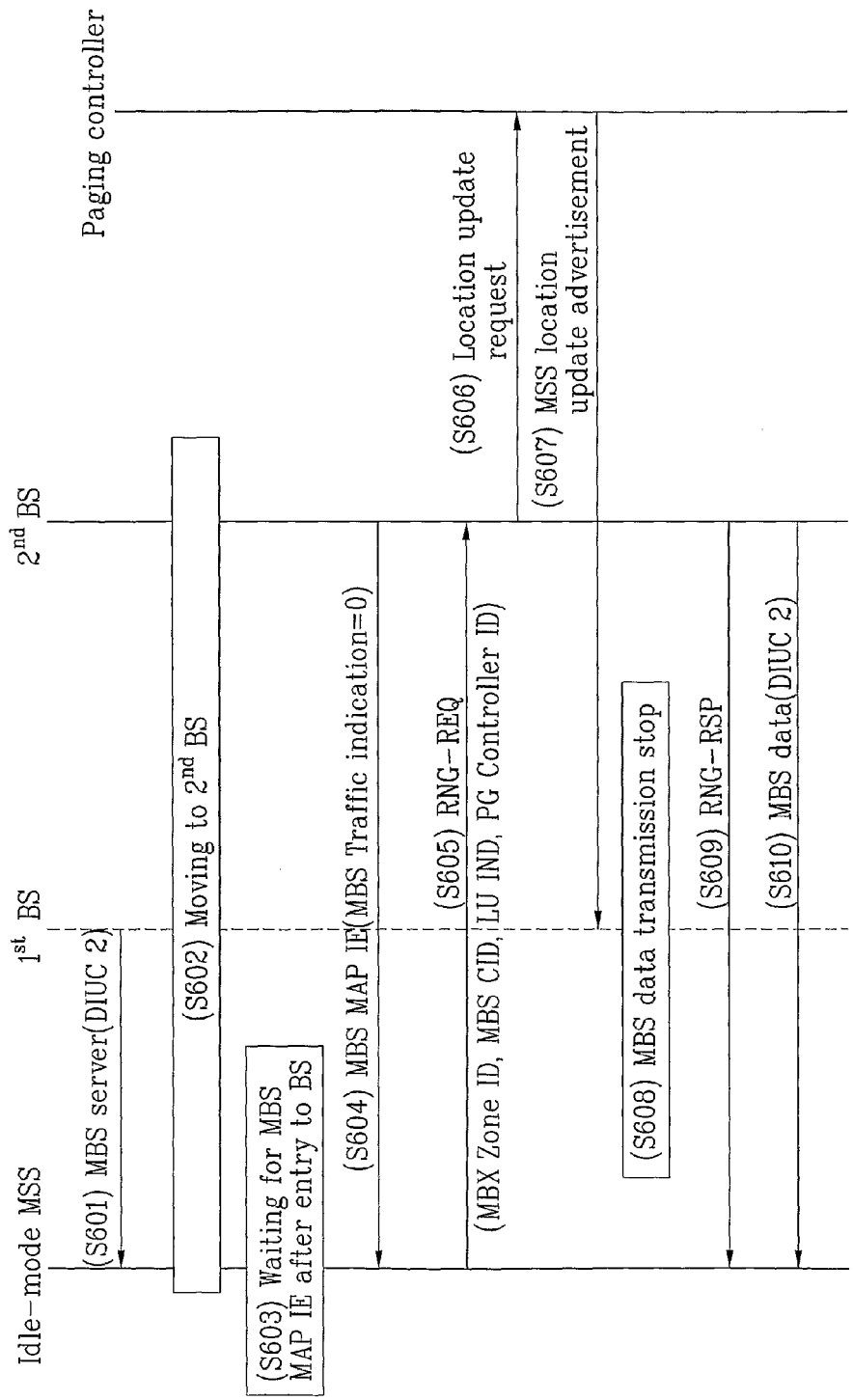
FIG. 16 is a flowchart of another preferred embodiment of the present invention.

FIG. 16 is a flowchart of another preferred embodiment of the present invention. In an embodiment of FIG. 16, in multiple base station MBS supporting diversity, in case that a base station capable of providing MBS does not transmit MBS data since a mobile subscriber station making a request for an MBS reception does not exist, a process that an idle-mode mobile subscriber station receives MBS in case of moving to a corresponding base station and a process that a base station decides whether to transmit MBS data by updating an existence or non-existence of a mobile subscriber station receiving MBS are explained.

In case that an idle-mode mobile subscriber station moves away into a second base station [S602] while receiving MBS data from a first base station via DIUC 1 [S601], the idle-mode mobile subscriber station waits for MBS MAP IE reception to know whether the second base station can provide MBS and whether the second base station currently transmits MBS data [S603].

The second base station informs mobile subscriber stations of information for a currently available MBS and information of an MBS that is currently transmitted. The idle-mode mobile subscriber station receives the information for the MBS having been received from the first base station via MBS MAP from the second base station to know that the corresponding MBS data is not currently transmitted from the second base station [S604].

In case of deciding that an MBS reception is possible via the MBS MAP information received from the second base station, the idle-mode mobile subscriber station includes MBS information (MBS CID, MBS Zone ID) to receive specifically such as Table 20 and TLV parameter such as a location update indicator, a paging controller ID and the like in RNG-REQ message and then makes a request for an MBS data transmission to the second base station together with a location update request [S605]. Even if a current base station is transmitting corresponding MBS data, the mobile subscriber station includes MBS information (MBS CID, MBS Zone ID) such as Table 24 and TLV parameter such as a location update indicator, a paging controller ID and the like in RNG-REQ message and then delivers it to the second base station.

The second base station delivers the location update request made by the corresponding idle-mode mobile subscriber station to a paging controller [S606]. The paging controller informs the first base station that the mobile subscriber station has moved away into the second base station [S607].

In case of deciding that a mobile subscriber station currently receiving MBS does not exist within a base station, the first base station does not transmit MBS data [S608]. Yet, the first base station delivers MBS MAP information at a determined time to deliver MBS information that can be provided to mobile subscriber stations.

In case of receiving a response indicating that a location update was successfully performed from the paging controller, the second base station sets MBS information (MBS CID, MBS Zone ID) such as Table 24 in RNG-RSP message together with a location update result and then delivers it to the idle-mode mobile subscriber station [S609].

The second base station delivers MBS MAP information (MBS CID, MBS zone ID, MBS Traffic Indication, symbol/subchannel offset, number of symbol/subchannel, DIUC next MBS frame offset, etc.) via MBS MAP IE proposed by the present invention such as Table 21, Table 22 and Table 23, and transmits MBS data to the idle-mode mobile subscriber station via MBS CID by configuring a burst profile (DIUC 2) of MBS data with the same MBS configuration information of other base station within an MBS zone [S610]. And, the idle-mode mobile subscriber station receives MBS data transmitted from the base station.

Figure 17:
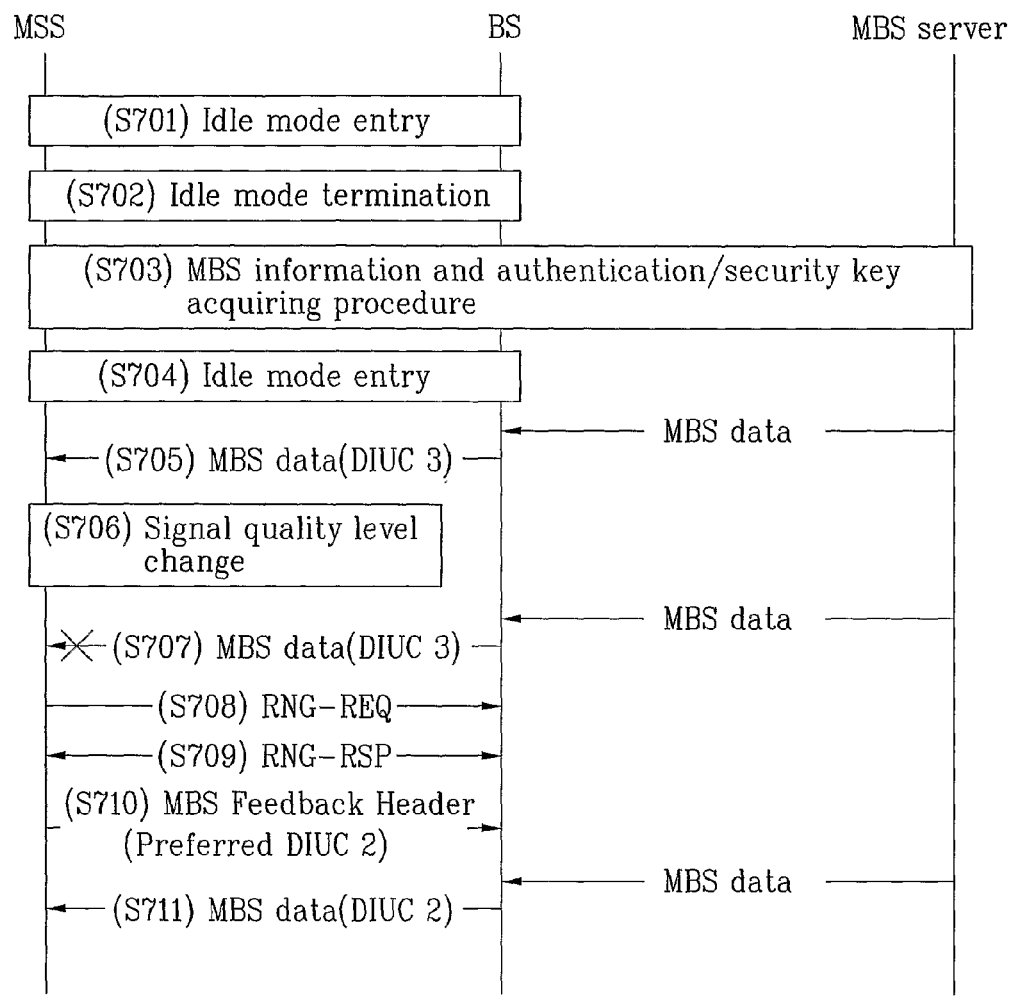
FIG. 17 is a flowchart of another preferred embodiment of the present invention.

FIG. 17 is a flowchart of another preferred embodiment of the present invention. In an embodiment of FIG. 17, a mobile subscriber station in an idle mode transmits MBS feedback information to a base station via MBS feedback header.

Referring to FIG. 17, a mobile subscriber station requests an entry of an idle mode by delivering a deregistration request (DREG_REQ) message to a base station. And, the base station approves the idle-mode entry by delivering a deregistration command (DREG_CMD) message to the mobile subscriber station. Subsequently, the mobile subscriber station enters the idle mode [S401] and then decides whether to sustain the idle mode, to perform a location update procedure or to terminate the idle mode by receiving a paging advertisement message delivered from the base station periodically.

To receive MBS data, the mobile subscriber station in the idle mode should acquire MBS associated parameter. For this, the mobile subscriber station terminates the idle mode [S702]. The mobile subscriber station performs an authentication procedure and an MBS associated parameter acquiring procedure via an MBS generating procedure with the base station and an MBS server [S703].

The mobile subscriber station having acquired the MBS associated parameter enters the idle mode again through the step S701 [S704]. In case that a mobile subscriber station in a normal mode enters an idle mode after having required MBS associated parameter, the steps S701 and S702 are omitted.

The MBS server delivers MBS data to the base station once MBS is initiated. The base station notifies location information and coding/modulation scheme of MBS data burst in a current frame and scheduling information of a next MBS data burst via MBS MAP (MBS_MAP IE or MBS MAP message) and then delivers MBS data to the mobile subscriber station [S705]. The mobile subscriber station in the idle mode receives the corresponding MBS data burst. In this case, it is assumed that a profile (appropriate coding and modulation scheme) of the MBS data burst received by the mobile subscriber station is 'DIUC=3'.

A downlink signal quality (CINR: carrier to interference and noise ratio) received by the mobile subscriber station from the base station in the course of MBS data reception can be degraded not to receive a currently delivered MBS data burst [s706]. In this case, if the base station transmits MBS data via a previous downlink burst profile (coding and modulation scheme), the mobile subscriber station may have error in receiving the MBS data [S707]. In such a case, the mobile subscriber station can make a request for a change of the downlink burst profile for MBS data transmission. And, the mobile subscriber station can transmit MBS feedback information by including information for a downlink burst profile to be specifically received in the MBS feedback information.

In order for the mobile subscriber station in the idle mode to transmit the MBS feedback information to the base station, an uplink transmission parameter should be preferentially adjusted. For this, the mobile subscriber station delivers a ranging request to the base station [S708]. In particular, in case of using OFDMA (orthogonal frequency division multiple access) system, a specific code for ranging is delivered to the base station. Otherwise, a ranging request message is delivered to the base station.

The base station having received the ranging request from the mobile subscriber station includes an uplink transmission parameter adjustment value and a ranging state value in a ranging response message and then transmits the message to the mobile subscriber station [S709].

The mobile subscriber station having acquires uplink transmission synchronization through a ranging process includes MBS feedback information in an MBS feedback header and then transmits it to the base station [S710]. The MBS feedback information transmitted by the mobile subscriber station to the base station includes information for appropriate coding and modulation scheme receivable by the mobile subscriber station and a connection identifier for MBS data transmission. The MBS feedback information preferably further includes a configuration change count (CCC) of a downlink channel descriptor (DCD) message that defines a burst profile associated with information for the connection ID (CID) of the MBS data and the coding and modulation scheme suitable for reception of the MBS data.

FIG. 18 is a diagram of an example of an MBS feedback header including MBS feedback information according to one embodiment of the present invention, which is explained in detail as follows.

1) Feedback Type: a value indicating an MBS feedback header is set.

2) CCC (configuration change count): indicating 4-bit LSB (least significant bit) of a configuration change count (CCC) of a downlink channel descriptor (DCD) message defining a burst profile associated with an index of a burst profile suitable for a mobile subscriber station to receive.

3) Preferred DIUC: indicating an index of a downlink burst profile (appropriate coding and modulation scheme) suitable for a mobile subscriber station to receive.

4) MBS CID: indicating a 16-bit connection identifier carrying MBS data.

In transmitting an MBS feedback header including the MBS feedback information to the base station from the mobile subscriber station, an uplink slot allocated to deliver the MBS feedback header only or a band request slot as a contention-based random access channel can be used. Alternatively, the mobile subscriber station makes a band request to the base station and can transmit the MBS feedback header via the uplink slot allocated by the base station.

The base station changes a downlink burst profile to be suitable for a plurality of mobile subscriber stations to receive MBS data based on MBS feedback information received from a plurality of the mobile subscriber stations and then transmits MBS data by the changed downlink burst profile [S411].

Figure 19:
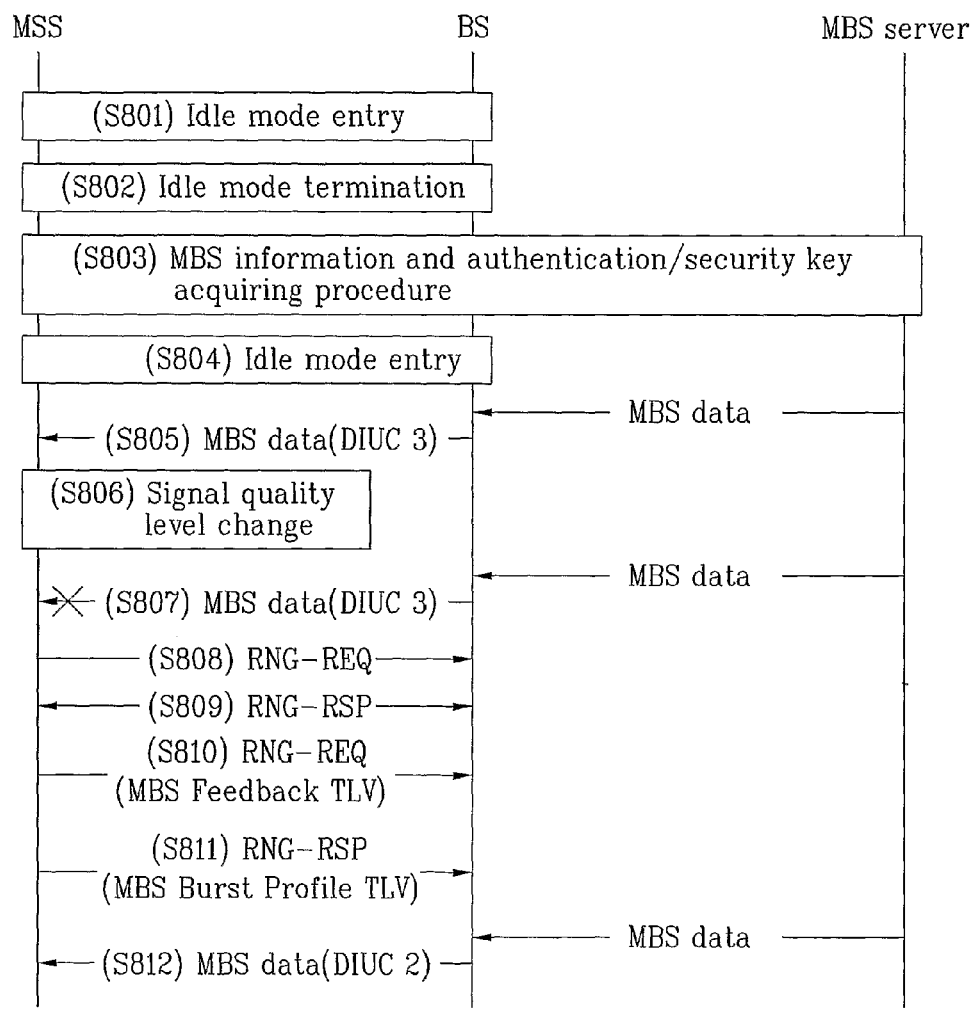
FIG. 19 is a flowchart of a further preferred embodiment of the present invention.

FIG. 19 is a flowchart of a further preferred embodiment of the present invention. In an embodiment of FIG. 19, a mobile subscriber station in an idle mode includes MBS feedback information in a ranging request message and then delivers it to enable a base station to appropriately change a downlink burst profile.

Referring to FIG. 19, explanations of steps S801 to S809 are equal to those of the steps S701 to S709, which will be omitted in the following description. In an embodiment shown in FIG. 19, in case of attempting a change of a downlink burst profile for MBS data transmission, a mobile subscriber station includes MBS feedback information in a ranging request message and then transmits it to a base station [S810].

The MBS feedback information transmitted to the base station by the mobile subscriber station includes information for appropriate coding and modulation scheme receivable by the mobile subscriber station and a connection identifier carrying MBS data. The MBS feedback information preferably further includes a configuration change count (CCC) of a downlink channel descriptor (DCD) message that defines a burst profile associated with information for the connection ID (CID) of the MBS data and the coding and modulation scheme suitable for reception of the MBS data.

Table 25 shows an example of MBS feedback information TLV (type length value) parameter included in a ranging request message.

TABLE 25

| Name | Type | Length | Value |
|---|---|---|---|
| MBS Feedback Information | TBD | 3 byte | Preferred DIUC for MBS connection identified by MBS CID<br>Bits 3:0 - Preferred DIUC - Preferred DIUC for MBS connection<br>Bits 7:4 - CCC - Configuration Change Count of DCD associated to DIUC<br>Bits 23:8 - MBS CID |

The base station having received the ranging request message including the MBS feedback information includes downlink burst profile information to be transmitted in the future in a ranging response message and then transmits it to the mobile subscriber station [S811]. Table 26 shows an example of downlink burst profile information TLV parameter included in a ranging response message.

TABLE 26

| Name | Type | Length | Value |
|------|------|--------|-------|
| MBS burst profile Information | TBD | 3 byte | This parameter is sent in response to the RNG-REQ Requested MBS Burst Profile. Bits 3:0 - Preferred DIUC - Preferred DIUC for MBS connection Bits 7:4 - CCC - Configuration Change Count of DCD associated to DIUC Bits 23:8 - MBS CID |

The base station changes a downlink burst profile to be suitable for a plurality of mobile subscriber stations to receive MBS data based on MBS feedback information received from a plurality of the mobile subscriber stations and then transmits MBS data by the changed downlink burst profile [S811].

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

According to the present invention, a base station providing an MBS is made to transmit MBS data via an MBS burst profile suitable for mobile subscriber stations to receive in a broadband wireless access system, whereby MBS quality received by mobile subscriber stations is guaranteed and whereby a base station can use radio resources effectively. Moreover, by enabling a base station to transmit MBS data according to an existence or non-existence of a mobile subscriber station receiving MBS, the present invention enables the base station to reduce waste of radio resources.

The invention claimed is:

1. A method of controlling transmission of multicast broadcast service (MBS) data at a base station (BS) in a broadband wireless access system, the method comprising:
   receiving, at the BS, dedicated downlink burst profile information for a dedicated downlink burst profile suitable for transmitting downlink data to each of a plurality of mobile subscriber stations, wherein the dedicated downlink burst profile information includes information about link quality of a channel;
   configuring, at the BS, the dedicated downlink burst profile corresponding to each of the plurality of mobile subscriber stations using the dedicated downlink burst profile information;
   transmitting, from the BS, the downlink data to each of the plurality of mobile subscriber stations using the corresponding dedicated downlink burst profiles;
   selecting, at the BS, a most robust dedicated downlink burst profile among the dedicated downlink burst profiles as a common MBS burst profile suitable for broadcasting the MBS data, wherein the most robust dedicated downlink burst profile is the dedicated downlink burst profile of a specific mobile subscriber station having a weakest downlink signal quality among the plurality of mobile subscriber stations;
   broadcasting, from the BS, the MBS data to the plurality of mobile subscriber stations using the selected common MBS burst profile;
   receiving, at the BS, a dedicated downlink burst profile change request message from the specific mobile subscriber station including downlink burst profile information for a changed dedicated downlink burst profile related to one or more mobile subscriber stations among the plurality of mobile subscriber stations;
   changing, at the BS, the selected common MBS burst profile from the most robust dedicated downlink burst profile to the changed downlink burst profile upon receiving the dedicated downlink burst profile change request message;
   broadcasting, by the BS, the MBS data to the plurality of mobile subscriber stations using the changed common MBS burst profile; and
   transmitting a MBS traffic indication and a next MBS MAP frame offset to at least one idle-mode mobile subscriber station among the plurality of mobile subscriber stations before broadcasting the MBS data, wherein the MBS traffic indication indicates whether the BS will be broadcasting the MBS data, and wherein the next MBS MAP frame offset is used to inform the at least one idle-mode mobile subscriber station of when the MBS data will be transmitted.

2. The method of claim 1, further comprising transmitting an MBS MAP message, including information about the changed dedicated downlink burst profile, to the plurality of mobile subscriber stations when the common MBS burst profile is changed.

3. The method of claim 1, further comprising:
   receiving a dedicated downlink burst profile suitable for transmitting the downlink data related to a second idle-mode mobile subscriber station among the plurality of mobile subscriber stations having moved into a cell; and
   selecting the common MBS burst profile further in consideration of the received dedicated downlink burst profile.

4. The method of claim 1, further comprising receiving each of the dedicated downlink burst profiles via a ranging request message.

* * * * *